United States Patent
Dewan

(10) Patent No.: US 10,819,507 B2
(45) Date of Patent: Oct. 27, 2020

(54) SECURE KEY SHARING BETWEEN A SENSOR AND A COMPUTING PLATFORM USING SYMMETRIC KEY CRYPTOGRAPHY

(71) Applicant: Intel Corporation, Santa Clara, CA (US)

(72) Inventor: Prashant Dewan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 245 days.

(21) Appl. No.: 15/856,609

(22) Filed: Dec. 28, 2017

(65) Prior Publication Data

US 2019/0044708 A1 Feb. 7, 2019

(51) Int. Cl.
*H04L 9/08* (2006.01)
*H04L 29/06* (2006.01)
*G06F 21/60* (2013.01)
*G06F 21/85* (2013.01)

(52) U.S. Cl.
CPC .......... *H04L 9/0819* (2013.01); *G06F 21/602* (2013.01); *G06F 21/85* (2013.01); *H04L 9/0822* (2013.01); *H04L 9/0825* (2013.01); *H04L 9/0861* (2013.01); *H04L 9/0897* (2013.01); *H04L 63/0435* (2013.01); *H04L 63/0861* (2013.01); *H04L 2209/805* (2013.01)

(58) Field of Classification Search
CPC ... H04L 63/06; H04L 9/00; H04L 9/08; G06F 21/60; G06F 21/31
See application file for complete search history.

(56) References Cited

U.S. PATENT DOCUMENTS

2018/0205728 A1* 7/2018 Bradley .................. H04W 4/80

OTHER PUBLICATIONS

"Public key infrastructure", accessed at https://en.wikipedia.org/w/index.php?title=Public_key_infrastructure&oldid=814881977, edited Dec. 11, 2017, 8 pages.
"Public-key cryptography", accessed at https://en.wikipedia.org/w/index.php?title=Public-key_cryptography&oldid=816629096, edited Dec. 22, 2017, 17 pages.
"Symmetric-key algorithm", accessed at: https://en.wikipedia.org/w/index.php?title=Symmetric-key_algorithm&oldid=815145989, edited Dec. 13, 2017, 4 pages.

(Continued)

*Primary Examiner* — Izunna Okeke
(74) *Attorney, Agent, or Firm* — Alliance IP, LLC

(57) ABSTRACT

Technologies disclosed herein provide an apparatus comprising a sensor including a first processor configured to execute first instructions to identify, based on an index, a first encrypted key of a first set of encrypted keys, identify, based on the index, a second encrypted key of a second set of encrypted keys, and extract a first trusted symmetric key from the first encrypted key using a first decryption algorithm and a first decryption key. The apparatus further comprises a computing platform coupled to the sensor and including a memory element and a processor configured to execute second instructions stored in the memory element to receive the second encrypted key from the sensor and extract a second trusted symmetric key from the second encrypted key using a second decryption algorithm and a second decryption key, where the first trusted symmetric key matches the second trusted symmetric key.

23 Claims, 12 Drawing Sheets

(56) References Cited

OTHER PUBLICATIONS

Rouse, Margaret, "asymmetric cryptography (public key cryptography)", accessed at: https://searchsecurity.techtarget.com/definition/asymmetric-cryptography, last updated Jun. 10, 2016, 2 pages.

* cited by examiner

SECURE KEY SHARING BETWEEN A SENSOR AND A COMPUTING PLATFORM USING SYMMETRIC KEY CRYPTOGRAPHY

TECHNICAL FIELD

This disclosure relates in general to the field of computing platform security and, more particularly, to secure key sharing between a sensor and a computing platform using symmetric key cryptography.

BACKGROUND

Computing platforms are increasingly being configured with various types of sensors to enable more secure user authentication. Examples of such sensors may include, but are not necessarily limited to, cameras, fingerprint sensors, facial feature sensors, and audio sensors. Securing input data detected by a sensor and communicated to the computing platform from the sensor is needed to effect secure user authentication. The limited compute capabilities of sensors, however, limit the security mechanisms that can be implemented. In addition, multiple entities involved in the manufacture and production of a device that includes a computing platform and a sensor for user authentication, may increase the risk of a security mechanism being compromised during the manufacturing and/or implementation. Thus, securing input data detected by a sensor and communicated to a computing platform presents design and implementation challenges. Accordingly, effective techniques to secure input data detected by sensors and communicated to computing platforms are needed.

BRIEF DESCRIPTION OF THE DRAWINGS

To provide a more complete understanding of the present disclosure and features and advantages thereof, reference is made to the following description, taken in conjunction with the accompanying figures, where like reference numerals represent like parts, in which.

DETAILED DESCRIPTION OF EMBODIMENTS

Figure 1:
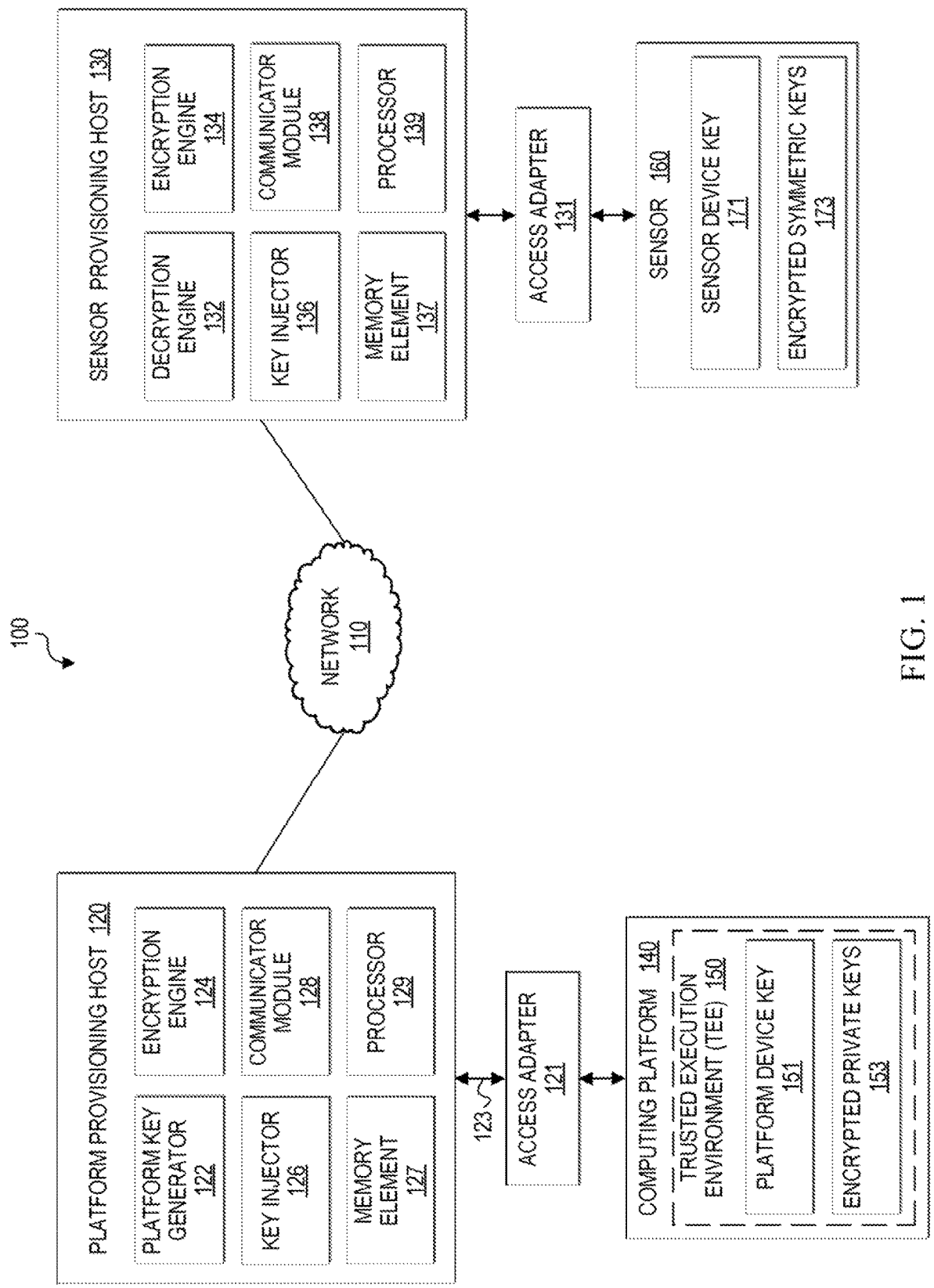
FIG. 1 is a simplified block diagram illustrating a communication system for provisioning a computing platform and a sensor to enable secure key sharing according to at least one embodiment of the present disclosure.

The following disclosure provides various possible embodiments, or examples, for implementing secure key sharing in a device between a computing platform and a sensor using symmetric key cryptography. A device may be configured with a computing platform and one or more sensors that enable user authentication and that provide other input data to the computing platform. A computing platform can include multiple components, including one or more processing units. For example, computing platforms in which teachings of the present disclosure may apply can include, but are not necessarily limited to, single-core and/or multi-core central processing units (CPUs), system on chips (SoCs), microprocessors, chips and microchips (e.g., Platform Controller Hub (PCH)), integrated circuits (ICs), graphical processing units (GPUs), and processing systems. Sensors used for user authentication can include microprocessors for sensing input from a human user. For example, a biometric sensor may be used to sense distinguishing biological characteristics (e.g., fingerprint, voice, facial features, eyes, etc.) of a human user. Other sensors may be used to sense other types of input that is non-biometric.

For purposes of illustrating the several embodiments that enable secure key sharing on a device between a computing platform and a sensor, it is important to first understand the lifecycle and configuration of computing platforms and sensors implemented with the computing platforms to facilitate user authentication. Accordingly, the following foundational information may be viewed as a basis from which the present disclosure may be properly explained.

Computing platforms, including both big core platforms and converged mobility platforms, are increasingly using sensors for user authentication. For example, biometric sensors are used to identify and authenticate a human user based on detecting particular biological characteristics of the user. As used herein, 'detecting' is intended to mean sensing, scanning, measuring, discovering, identifying, and/or recognizing the particular biological characteristics or properties (or non-biological characteristics or properties) that a sensor is capable of detecting. For example, a fingerprint sensor can be used to detect a fingerprint, a microphone can be used to detect a voice (for both voice identification and speech recognition), an eye sensor can be used to detect eye retinas and/or irises, a facial sensor can be used to detect facial features, a hand sensor can be used to detect hand measurements/geometry and/or palm prints, a pulse sensor can be used to detect pulse features, and a vein pattern sensor can be used to detect vein patterns.

Achieving secure user authentication with sensor input data requires the input data communicated from a sensor to a computing platform to be protected from malicious or inadvertent disclosure. Although currently available sensors offer some security mechanisms, the functionality added by these sensors tends to increase cost and complexity, rendering them inadequate in many implementation scenarios. For example, self-encrypting sensors may have a capability of performing Advanced Encryption Standard 128 (AES-128) or Advanced Encryption Standard 256 (AES-256) bit encryption. Firmware in a self-encrypting sensor may be hashed with a symmetric key and replay-protected. However, any new firmware has to be hashed with the same symmetric key owned by the sensor vendor (e.g., sensor manufacturing entity). Since there is no pre-negotiated key between the computing platform and the sensor, a key is either provisioned in the sensor and the computing platform during manufacturing or the sensor has to be capable of more sophisticated key negotiation protocols (e.g., RSA/Diffie-Hellman).

In another example, a match-on-sensor generally requires login and enrollment to generate a template within the sensor. The value read by the sensor is matched with the value in the template within the sensor, and the result is sent to the computing platform. Although the data itself does not leave the sensor, match-on-sensors are not cost efficient for most user authentication purposes. In yet another example, bare sensors receive input data, but perform neither matching nor encryption. Instead the data is sent directly to the computing platform. Thus, data communicated by a bare sensor may be particularly vulnerable to disclosure.

Due to the limited compute capabilities of sensors, sensors generally cannot perform asymmetric key cryptography. However, there is no good way of binding sensors to the computing platform using symmetric keys. Although binding (i.e., sharing of symmetric keys) can theoretically be done at manufacturing, practically, for many products such as mobile devices, the manufacturing is owned by neither the device vendor nor the platform vendor. Instead, it is typically owned by a different entity such as an Original Device Manufacturer (ODM), which is often not trusted with the keys. While public-key infrastructure (PKI) is often used to enable untrusting parties to share a symmetric key via an untrusted channel, sensors are generally low-cost items that cannot absorb the additional expense of adding PKI. In addition, the cost of issuing PKI certificates for a sensor vendor would significantly increase costs. Consequently, secure key sharing between sensors and computing platforms remains impracticable. Thus, a technique is needed in which keys can be shared between a trusted execution environment (TEE) in a computing platform and an attached sensor without the use of expensive PKI and without trusting a third party with the keys.

Figure 2:
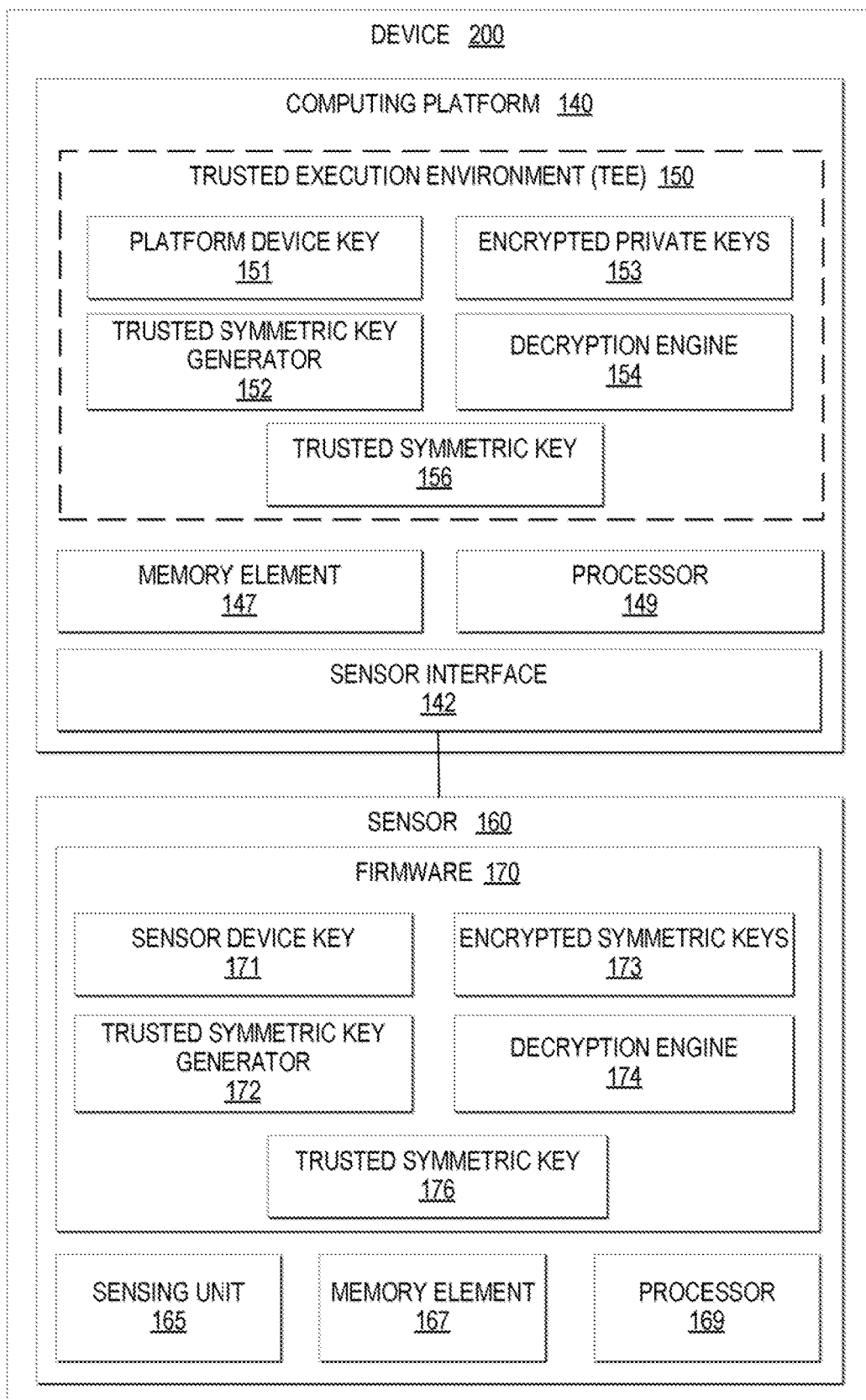
FIG. 2 is a simplified block diagram of additional possible details of a device that includes a computing platform and a sensor according to at least one embodiment.

A communication system 100 as shown in FIG. 1, and a device 200 implemented with a resulting provisioned computing platform 140 and a provisioned sensor 160 as shown in FIG. 2, resolves many of the aforementioned issues (and more). The simplified block diagram of FIG. 1 illustrates communication system 100 that provisions computing platform 140 and sensor 160 to enable secure key sharing between the sensor and a trusted execution environment (TEE) 150 in the computing platform, once the sensor is coupled to the computing platform. This key sharing can be performed without the use of expensive PKI and without trusting a third party with the keys. A computing platform vendor can communicate with a sensor vendor to facilitate coordinated provisioning of computing platforms and sensors, where the sensors are subsequently attached to the computing platforms during device manufacturing of an end product (e.g., device 200), for example.

More particularly, a platform provisioning host 120 associated with a computing platform vendor can generate a set of public and private keys ($Pu_n$ and $Pr_n$, for n=1-N) and a set of symmetric keys ($Ks_n$, for n=1-N). The symmetric keys are encrypted, respectively, with the public keys to generate a first set of encrypted keys. The symmetric keys are also encrypted with a public key associated with a sensor vendor to generate a second set of encrypted keys, which may be implemented as individually encrypted keys in the set or as a single encrypted result. The first and second sets of encrypted keys are sent to a sensor provisioning host associated with the sensor vendor. The sensor provisioning host embeds the first set of encrypted keys in firmware of one or more sensors. The sensor provisioning host also extracts the symmetric keys from the second set of encrypted keys, encrypts the extracted symmetric keys with a sensor device key, and provisions the set of sensor-encrypted symmetric keys into the firmware of the one or more sensors. The private keys generated by the platform provisioning host are encrypted with a unique platform device key to generate a set of encrypted private keys, which can be provisioned in the computing platform.

Once a computing platform and a sensor have been provisioned, they can be used to manufacture a device, such as a mobile device or desktop device, for example. When the computing platform and sensor are communicatively connected and the computing platform boots up, an index i is randomly selected. The index i is shared via an untrusted channel from the computing platform to the sensor. The computing platform sends the index i to the sensor through an untrusted channel. The sensor identifies the $i^{th}$ encrypted key in the second set of encrypted keys embedded in the sensor, identifies a sensor device key, and extracts a symmetric key for the sensor by decrypting the $i^{th}$ encrypted key of the second set of encrypted keys. The sensor also identifies the $i^{th}$ encrypted key in the first set of encrypted keys embedded in the sensor, and sends the identified $i^{th}$ encrypted key back to the computing platform through the untrusted channel. The computing platform identifies the $i^{th}$ encrypted private key in the computing platform secure storage, extracts the $i^{th}$ private key by decrypting the encrypted private key with the platform device key, and extracts a symmetric key for the computing platform by decrypting the $i^{th}$ encrypted key received from the sensor using the extracted $i^{th}$ private key. If the resulting decryption is clear, then the sensor and the computing platform have a shared symmetric key. The shared symmetric key can be used for sending encrypted data across any untrusted channel (e.g., serial peripheral interface (SPI), cameral serial interface (CSI), mobile industry processor interface (MIPI), etc.).

This solution of smartly using symmetric key cryptography provides several significant advantages. Embodiments described herein can thwart any man-in-the middle, whether it is an untrusted manufacturing entity or malware in a channel, without the use of expensive public key cryptography in the sensor. Accordingly, sensor vendors can offer secure sensors at a significant cost savings. Similarly, computing platform vendors can offer computing platforms with secure communication to sensors based on the secure shared symmetric keys without needing expensive access control techniques to provision secure sensors. Furthermore, as the demand for secure sensors on computing platforms continues to increase, embodiments described herein can help maintain a constant cost for provisioning those sensors. Additionally, in contrast to a manufacturer provisioning the keys, embodiments described herein also allow for revocation of compromised keys. If a key is compromised due to vulnerabilities in a TEE, for example, the TEE can request another key (1≤n'≤N). If all the N keys are compromised, the sensor vendor can perform a firmware update and plumb another set of N keys to the affected sensors.

With reference to FIG. 1, FIG. 1 illustrates communication system 100 for provisioning computing platforms and sensors. Communication system includes a platform provisioning host 120, a computing platform 140, a sensor provisioning host 130, and a sensor 160. An access adapter 121 can facilitate communication between platform provisioning host 120 and computing platform 140. An access adapter 131 can facilitate communication between sensor provisioning host 130 and sensor 160. A network 110 facilitates communication between platform provisioning host 120 and sensor provisioning host 130. Platform provisioning host 120 includes a platform key generator 122, an encryption engine 124, a key injector 126, a communicator module 128, and hardware elements such as a memory element 127 and a processor 129. Sensor provisioning host 130 includes a decryption engine 132, an encryption engine 134, a key injector 136, and a communicator module 138, and hardware elements such as a memory element 137 and a processor 139.

A brief discussion is now provided about some of the possible infrastructure that may be included in communication system 100. Generally, communication system 100 can include any type or topology of networks, indicated by network 110. Network 110 represents a series of points or nodes of interconnected communication paths for receiving and sending network communications that propagate through communication system 100. Network 110 offers a communicative interface between nodes, and may be configured as any local area network (LAN), virtual local area network (VLAN), wide area network (WAN) such as the Internet, wireless local area network (WLAN), metropolitan area network (MAN), Intranet, Extranet, virtual private network (VPN), any other appropriate architecture or system that facilitates communications in a network environment, or any suitable combination thereof. Network 110 can use any suitable technologies for communication including wireless (e.g., 3G/4G/5G/nG network, WiFi, Institute of Electrical and Electronics Engineers (IEEE) Std 802.11™-2012, published Mar. 29, 2012, WiMax, IEEE Std 802.16™-2012, published Aug. 17, 2012, Radio-frequency Identification (RFID), Near Field Communication (NFC), Bluetooth™, etc.) and/or wired (e.g., Ethernet, etc.) communication. Generally, any suitable means of communication may be used such as electric, sound, light, infrared, and/or radio (e.g., WiFi, Bluetooth or NFC).

Network traffic (also referred to herein as 'network communications' and 'communications'), can be inclusive of packets, frames, signals, data, objects, etc., and can be sent and received in communication system 100 according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). The term 'data' as used herein, refers to any type of binary, numeric, voice, video, textual, photographic, or script data, or any type of source or object code, or any other suitable information in any appropriate format that may be communicated from one point to another in computing systems (e.g., hosts, devices, endpoints, servers, computing systems, computing devices, etc.) and/or networks. Additionally, messages, requests, responses, replies, queries, etc. can be forms of network traffic.

Platform provisioning host 120 and sensor provisioning host 130 can each be provisioned in any suitable network environment capable of network access (e.g., via network 110) to each other. Platform provisioning host 120 and sensor provisioning host 130 include are network elements, which may encompass one or more servers, routers, switches, gateways, bridges, load balancers, firewalls, inline service nodes, proxies, proprietary appliance, servers, processors, or modules (any of which may include physical hardware or a virtual implementation on physical hardware) or any other device, component, element, or object operable to exchange information in a network environment. A network element may include any suitable hardware, software, firmware, components, modules, interfaces, or objects that facilitate the operations thereof. Some network elements may include virtual machines adapted to virtualize execution of a particular operating system. Additionally, network elements may be inclusive of appropriate algorithms and communication protocols that allow for the effective exchange of data or information.

In platform provisioning host 120, communicator module 128 enables sending communications to and receiving communications from sensor provisioning host 130. Platform key generator 122 is provided to generate public and private key pairs ($Pu_n$ and $Pr_n$, for n=1-N) and symmetric keys ($Ks_1$-$Ks_N$). In one example implementation, the symmetric keys may each be 256 bits. The number N may vary depending on, for example, the particular needs and implementation requirements for the particular market segment and/or on the resources of the platform vendor and sensor vendor. An upper limit of the number N is defined by the amount of storage available in the computing platform 140 and sensor 160. In one example implementation, N may be configured to be at least 3096.

Encryption engine 124 provides one or more algorithms for encoding data (e.g., the generated symmetric keys, the generated private keys of the public-private key pairs) from plaintext to ciphertext using a particular key (e.g., the public keys of the public and private key pairs, a public key from the sensor, a unique platform device key of the computing platform). The ciphertext is unintelligible unless it is decrypted.

In at least one embodiment, encryption engine 124 may include both asymmetric-key encryption algorithms (also referred to herein as 'asymmetric encryption algorithms') and symmetric-key encryption algorithms (also referred to herein as 'symmetric encryption algorithms'). In an asymmetric cryptography scheme, a first entity generates an asymmetric public and private key pair. The public key may be published or otherwise provided to a second entity (or multiple other entities) to be used to encrypt data. The original data can be extracted by using a corresponding decryption algorithm with the corresponding private key. Generally, a private key of a public-private key pair is protected (e.g., not disclosed to other entities, disclosed only to selected entities, encrypted or otherwise protected when disclosed to any other entities, etc.) to prevent unauthorized decryption of the encrypted data. Examples of possible asymmetric cryptography algorithms that could be used in one or more embodiments disclosed herein may include, but are not necessarily limited to, Rivest-Shamir-Adleman (RSA) algorithms, Diffie-Hellman algorithms, or Elliptic Curve Cryptography (ECC) algorithms.

In at least one embodiment, an asymmetric encryption algorithm may be used to encrypt the symmetric keys $Ks_1$-$Ks_N$ using, respectively, the public keys $Pu_1$-$Pu_N$ of the public-private key pairs generated by host 120. A corresponding asymmetric decryption algorithm can be used by computing platform 140 (after being provisioned and coupled to sensor 160) to extract a symmetric key from a particular encrypted symmetric key from the set of encrypted symmetric keys $B_1$-$B_N$. A corresponding private key of a key pair in the set of key pairs ($Pu_n$ and Pr for n=1-N) may be used as the decryption key. An asymmetric encryption algorithm may also be by encryption engine 124 to encrypt symmetric keys $Ks_1$-$Ks_N$ using a public key $Pu_{SENSOR}$ of a public-private key pair associated with the sensor. A corresponding asymmetric decryption algorithm can be used by sensor 160 (after being provisioned and coupled to computing platform 140) to extract the symmetric keys. A corresponding private key r $Pr_{SENSOR}$ of the sensor's public-private key pair may be used as the decryption key.

Encryption engine 124 may also include one or more symmetric-key encryption algorithms. In a symmetric cryptography scheme, the encryption and decryption keys are the same. Symmetric cryptography algorithms that could be used in one or more embodiments disclosed herein may use stream ciphers and/or block ciphers. Examples of possible symmetric cryptography algorithms that could be used in one or more embodiments disclosed herein may include, but are not necessarily limited to, Advanced Encryption Standard (AES) algorithms, Twofish algorithms, or Blowfish algorithms. In one example, a symmetric encryption algorithm may be used to encrypt each private key in the set of private keys $Pr_1$-$Pr_N$ generated by platform provisioning host 120. The encryption (and decryption) may be performed using a platform device key, $PDK_P$, where D represents the particular computing platform being provisioned. The encrypted private keys are represented herein by $EPr_1$-$EPr_N$.

During provisioning of a computing platform, such as computing platform 140, platform provisioning host 120 is connected to the computing platform through some type of adapter, represented by access adapter 121. One common way of provisioning a hardware device with data, such as encrypted private keys $EPr_1$-$EPr_N$, is a flash/gang programmer that is used to make a physical connection to the device in order to transfer the data into flash memory of the device. In other scenarios where data is stored in fuses, a software tool may be used to program the fuses in the hardware device.

Key injector 126 of platform provisioning host 120 provides data to interface 123 to be embedded in computing platform 140 by access adapter 121. In at least one embodiment, the data embedded on the computing platform includes a set of encrypted private keys $EPr_1$-$EPr_N$, which were encrypted using a platform device key $PDK_P$ of the computing platform being provisioned.

In at least one embodiment, computing platform 140 can include a trusted execution environment (TEE) 150, which is a secure computing environment that protects selected code and data from inadvertent or malicious disclosure or modification. An example of a TEE is an enclave, which can be established as a protected area of execution in a process. Enclaves are isolated memory regions of code and data. Applications can use special central processing unit (CPU) instructions to create enclaves and to control entries into and exits from running in an enclave mode in which the isolated memory regions can be accessed. Thus, enclaves can be protected from other code that is not in the enclave. A unique platform device key 151 may be stored in a protected memory region of computing platform 140 when accessed by a process. The set of private keys, each of which is encrypted by the platform device key 151, may also be stored in a protected memory region of computing platform 140 when accessed by a process.

In sensor provisioning host 130, communicator module 138 enables sending communications to and receiving communications from platform provisioning host 120. Sensor provisioning host 130 can include decryption engine 132, which provides one or more asymmetric decryption algorithms for decoding encrypted data (e.g., encrypted symmetric keys) from ciphertext to plaintext using a private key of a public-private key pair. In one example, decryption engine 132 facilitates extracting the symmetric keys $Ks_1$-$Ks_N$ from the encrypted symmetric keys $Bs_{SENSOR}$ received from platform provisioning host 120. Extraction may be achieved by performing one or more asymmetric decryption algorithms using a private key r $Pr_{SENSOR}$ of the sensor's public-private key pair.

Encryption engine 134 enables a symmetric cryptography scheme. For example, encryption engine 134 provides one or more symmetric encryption algorithms for encoding data (e.g., the extracted symmetric keys) from plaintext to ciphertext using a particular key (e.g., sensor device key). A corresponding decryption algorithm uses the same key (e.g., sensor device key) to decrypt the encrypted data. In at least one embodiment, a symmetric encryption algorithm may be used to encrypt the extracted symmetric keys $Ks_1$-$Ks_N$ using a sensor device key, $SDK_S$, where S represents the particular sensor being provisioned. The encrypted symmetric keys are represented herein by $M_1$-$M_N$.

Key injector 136 provides data to access adapter 131 to be embedded in sensor 160. In at least one embodiment, the data embedded in the sensor includes sets of encrypted symmetric keys 173, such as the set of encrypted symmetric keys $B_1$-$B_N$ received from platform provisioning host 120 and the set of encrypted symmetric keys $M_1$-$M_N$ encrypted by sensor provisioning host 130. Sensors can be provisioned in numerous ways depending, at least in part, on the capability of the sensor controller. In one example, provisioning a sensor can be facilitated by access adapter 131. Access adapter 131 may represent a flash/gang programmer that is used to make a physical connection to the sensor in order to transfer data, such as the sets of encrypted symmetric keys $B_1$-$B_N$ and $M_1$-$M_N$, into flash memory of the sensor. In other scenarios where data is stored in fuses, a software tool may be used to program the fuses in the sensor.

In at least one embodiment, each sensor, such as sensor 160 is provisioned with a unique sensor device key 171. Sensor device key 171 may be embedded in the firmware of the sensor. Also, the sets of encrypted symmetric keys may be embedded in the firmware. For example, the set of encrypted symmetric keys that were encrypted by the platform provisioning host (e.g., $B_1$-$B_N$) and the set of encrypted symmetric keys that were encrypted by the sensor (e.g., $M_1$-$M_N$) may be embedded in firmware of sensor 160.

For ease of illustration, a single computing platform (e.g., 140) and a single sensor (e.g., 160) are illustrated in communication system 100 of FIG. 1. It should be apparent, however, that multiple computing platforms and sensors may be provisioned by platform provisioning host 120 and sensor provisioning host 130, respectively.

It should be noted that platform provisioning host 120 is intended to represent one or more hosts or devices. In certain implementations, a separate platform server (or other device) may be configured to communicate with one or more sensor vendors (e.g., via a sensor provisioning host or other device) to share public keys, encrypted key sets, and any other appropriate information. In this implementation, a separate and/or dedicated platform provisioning host may be configured to receive provisioning information from the platform server and to access computing platforms via an access adapter.

Similarly, it should also be noted that sensor provisioning host 130 is intended to represent one or more hosts or devices. In certain implementations, a separate sensor server (or other device) may be configured to communicate with one or more platform vendors (e.g., via a platform provisioning host or other device) to share public keys, encrypted key sets, and any other appropriate information. In this implementation, a separate and/or dedicated sensor provisioning host may be configured to receive sensor provisioning information from the sensor server and to access computing platforms via an access adapter.

Turning to FIG. 2, FIG. 2 is a simplified block diagram of device 200, which is implemented with provisioned computing platform 140 and provisioned sensor 160. As used herein, a 'device,' such as device 200, can include any electronic device assembled with both a computing platform and a sensor in which the data communications between the computing platform and the sensor are to be protected from disclosure, whether inadvertent, malicious, or otherwise. For example, device 200 is intended to include, but is not necessarily limited to, a mobile device (e.g., smart phone, table, phablet, eBook reader, etc.), a personal computer, a laptop, a gaming system, an infotainment system in a vehicle (e.g., automobile, airplane, train, bus, subway, etc.), a wearable electronic device, an embedded device, and any other component, element, or object operable to exchange information between a computing platform and a sensor. In other implementations, device 200 may include network elements such as servers, appliances, routers, processors, processing systems, or any other suitable component, element, or object operable to exchange information in a network environment and to exchange information between a computing platform and a sensor.

Computing platform 140 includes TEE 150, a memory element 147, a processor 149, and a sensor interface 142. TEE 150, as previously described herein, is a secure computing environment that protects selected code and data from inadvertent or malicious disclosure or modification. The unique platform device key 151 and the set of encrypted private keys 153 may be stored in a protected memory region of TEE 150. TEE 150 may also store code of a trusted symmetric key generator 152 and a decryption engine 154. Additionally, once generated, a trusted symmetric key 156 may be stored in protected memory when accessed by a process (e.g., a process to extract input data from encrypted data received from the sensor to be provided to a user authentication process).

During runtime, trusted symmetric key generator 152 may facilitate communications with sensor 160 and perform other operations to select an index i, send the index i to sensor 160, receive an encrypted symmetric key indexed by index i ($B_i$), and upon performing appropriate decryption algorithms, store a resulting trusted symmetric key $Ks_i$ in the computing platform. The resulting trusted symmetric key should correspond to a trusted symmetric key generated by sensor 160.

The index generated by computing platform 140 is limited by the total number of symmetric keys generated by platform provisioning host. For example, in one implementation an index i may be $1 \leq i \leq N$, where N is equal to the total number of symmetric keys generated by platform provisioning host 120 during provisioning. In one embodiment, the index may be randomly selected and may be limited to an index that has not previously been selected by the computing platform, or that has not been selected during a particular period of time or length of time. In other embodiments, the index may be selected based on a predetermined order of selection.

Trusted symmetric key generator 152 may also dynamically initiate generating a new trusted symmetric key. This may occur, for example, based on computing platform 140 determining that the trusted symmetric key has been compromised, based on a predetermined amount of time passing, or based on detected data being communicated to computing platform 140 from sensor 160 (e.g., each time a user attempts user authentication at the device).

Decryption engine 154 provides one or more decryption algorithms for decoding data (e.g., encrypted private keys, encrypted symmetric keys) from ciphertext to plaintext using a particular key (e.g., platform device key, private key generated by platform provisioning host 120). In at least one embodiment, decryption engine 154 may include one or more symmetric decryption algorithms corresponding to the one or more symmetric encryption algorithms of encryption engine 124 in platform provisioning host 120. In at least one embodiment, decryption engine 154 may extract a private key $Pr_i$ from an encrypted private key $EPr_i$ of the set of encrypted private key pairs $EPr_1$-$EPr_N$ stored in the computing platform. The extraction may be achieved using a symmetric decryption algorithm and the platform device key $PDK_P$ of computing platform 140.

In at least one embodiment, decryption engine 154 may also include one or more asymmetric decryption algorithms corresponding to the one or more asymmetric encryption algorithms of encryption engine 124 in platform provisioning host 120. In at least one embodiment, decryption engine 154 may extract a trusted symmetric key $Ks_i$ from an encrypted symmetric key $B_i$ provided to computing platform 140 from sensor 160, where the symmetric key $B_i$ is one of the set of encrypted symmetric keys $B_1$-$B_N$ stored in the sensor. The extraction may be achieved using an asymmetric decryption algorithm and the extracted private key $Pr_i$.

Once the trusted symmetric key is generated on computing platform 140 and stored in protected memory of TEE 150, it may be used to perform symmetric key cryptography on data being communicated from sensor 160 to computing platform 140 (and potentially vice versa). Sensor interface 142 is provided in computing platform 140 to enable input data that is detected by sensor 160 to be communicated to computing platform 140.

A sensor is a device that is capable of detecting some type of input from the physical environment and may respond to the input. For example, a sensor may detect a physical property or stimulus (e.g., heat, light, sound, touch, moisture, pressure, motion, magnetism, etc.). In at least one embodiment, a sensor such as sensor 160 is intended to include any biometric sensor for detecting particular biological characteristics. For example, a fingerprint sensor can be used to detect a fingerprint, a microphone can be used to detect a voice (for both voice identification and speech recognition), an eye sensor can be used to detect eye retinas and/or irises, a facial sensor can be used to detect facial features, a hand sensor can be used to detect hand measurements/geometry and/or palm prints, a pulse sensor can be used to detect pulse features, and a vein pattern sensor can be used to detect vein patterns. Biometric sensor can be particularly useful for user authentication of a user to a device in which data detected by the biometric sensor may be communicated in a secure manner using embodiments described herein. In other implementations, however, embodiments described herein can be applied to any type of sensor in which it is needed or otherwise desired to securely communicate the detected input from a sensor to an associated computing platform.

Sensor 160 can include a sensing unit 165, a memory element 167, a processor 169, and firmware 170. Code such as a trusted symmetric key generator 172, and a decryption engine 174 may be embedded in firmware 170. A unique sensor device key 171 and two sets of encrypted symmetric keys 173 may also be embedded in firmware 170. For example, a first set of encrypted symmetric keys $B_1$-$B_N$ generated by encryption engine 124 of platform provisioning host 120 and a second set of encrypted symmetric keys $M_1$-$M_N$ generated by encryption engine 134 of sensor provisioning host 130 may be embedded in firmware 170.

During runtime, trusted symmetric key generator 172 may facilitate communications with computing platform 140 and perform other operations to generate and store a resulting trusted symmetric key corresponding to a trusted symmetric key generated by computing platform 140. For example, trusted symmetric key generator 172 can receive an index i from computing platform 140, identify a first indexed encrypted key $B_i$ of the set of encrypted keys $B_1$-$B_N$ embedded in sensor 160, send the first encrypted key $B_i$ to computing platform 140, identify a second indexed encrypted key $M_i$ of the set of encrypted keys $M_1$-$M_N$, and upon performing appropriate decryption algorithms on the second encrypted key $M_i$, storing a resulting trusted symmetric key $Ks_i$ in sensor 160.

Trusted symmetric key generator 172 may also dynamically initiate generating a new trusted symmetric key. This may occur, for example, based on receiving a new index i from computing platform 140. When a new index i is received, sensor 160 can identify a third indexed encrypted key of the set of encrypted keys $B_1$-$B_N$, send the third encrypted key $B_i$ to computing platform 140, identify a fourth indexed encrypted key $M_i$ of the set of encrypted keys $M_1$-$M_N$, and upon performing appropriate decryption algorithms on the fourth encrypted key $M_i$, store a new trusted symmetric key $Ks_i$ in sensor 160.

Decryption engine 174 provides one or more symmetric decryption algorithms for decoding data (e.g., encrypted symmetric keys) from ciphertext to plaintext using a particular key (e.g., sensor device key). In one example, decryption engine 174 may include one or more symmetric decryption algorithms corresponding to the one or more symmetric encryption algorithms of encryption engine 134 in sensor provisioning host 130. In at least one embodiment, decryption engine 174 may extract the symmetric key indexed by index i in the set of encrypted symmetric keys $M_1$-$M_N$ using the unique sensor device key $SDK_S$.

Once the trusted symmetric key is generated and stored in firmware 170 of the sensor, the trusted symmetric key may be used to perform symmetric key cryptography on data being communicated from sensor 160 to computing platform 140 (and possibly vice versa). Sensing unit 165 is provided in sensor 160 to enable detection of input. Once input is detected, it can be encrypted using the trusted symmetric key stored in the sensor and communicated to computing platform 140.

Figure 3:
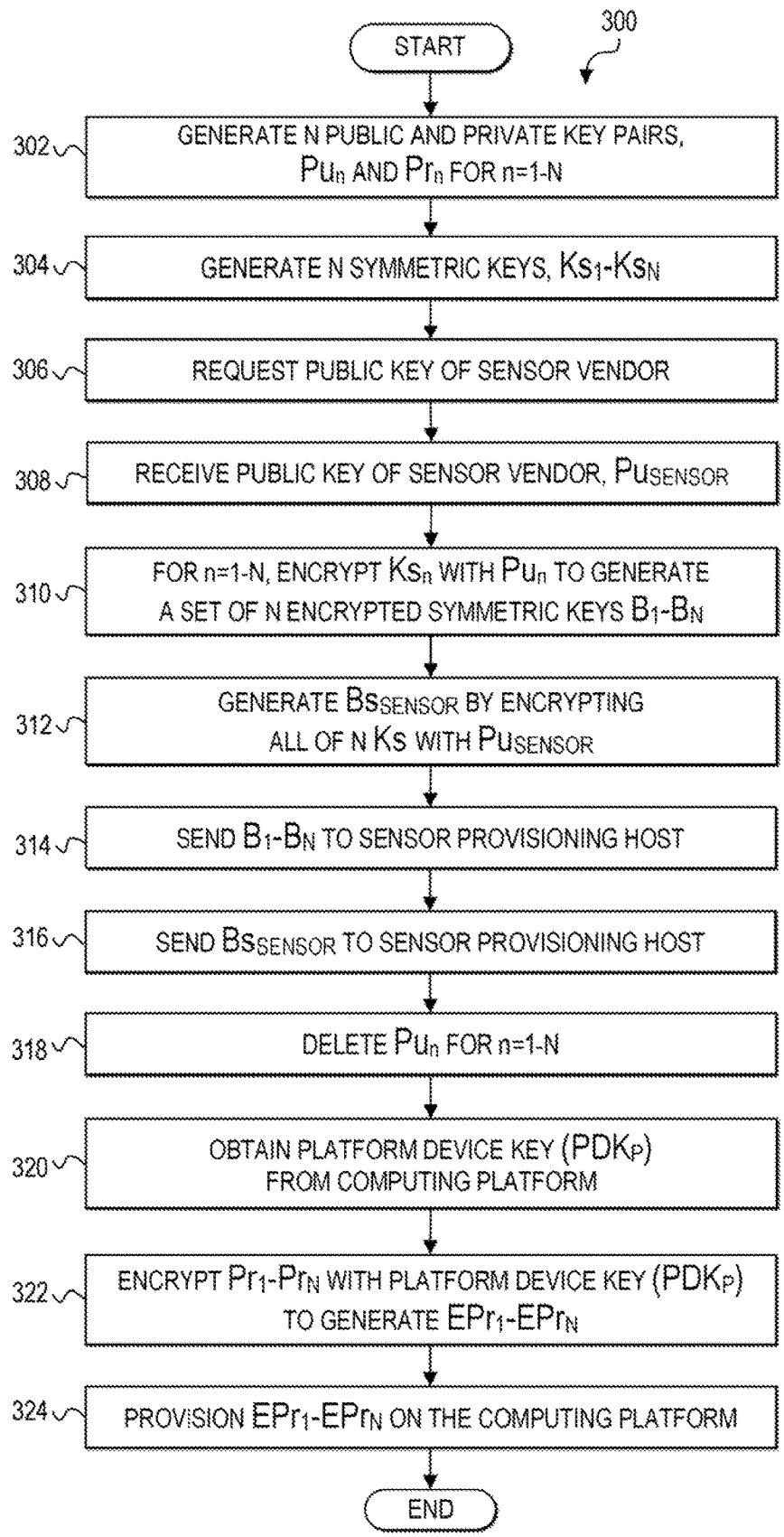
FIG. 3 is a simplified flow chart illustrating example operations associated with provisioning a computing platform according to at least one embodiment.
Figure 4:
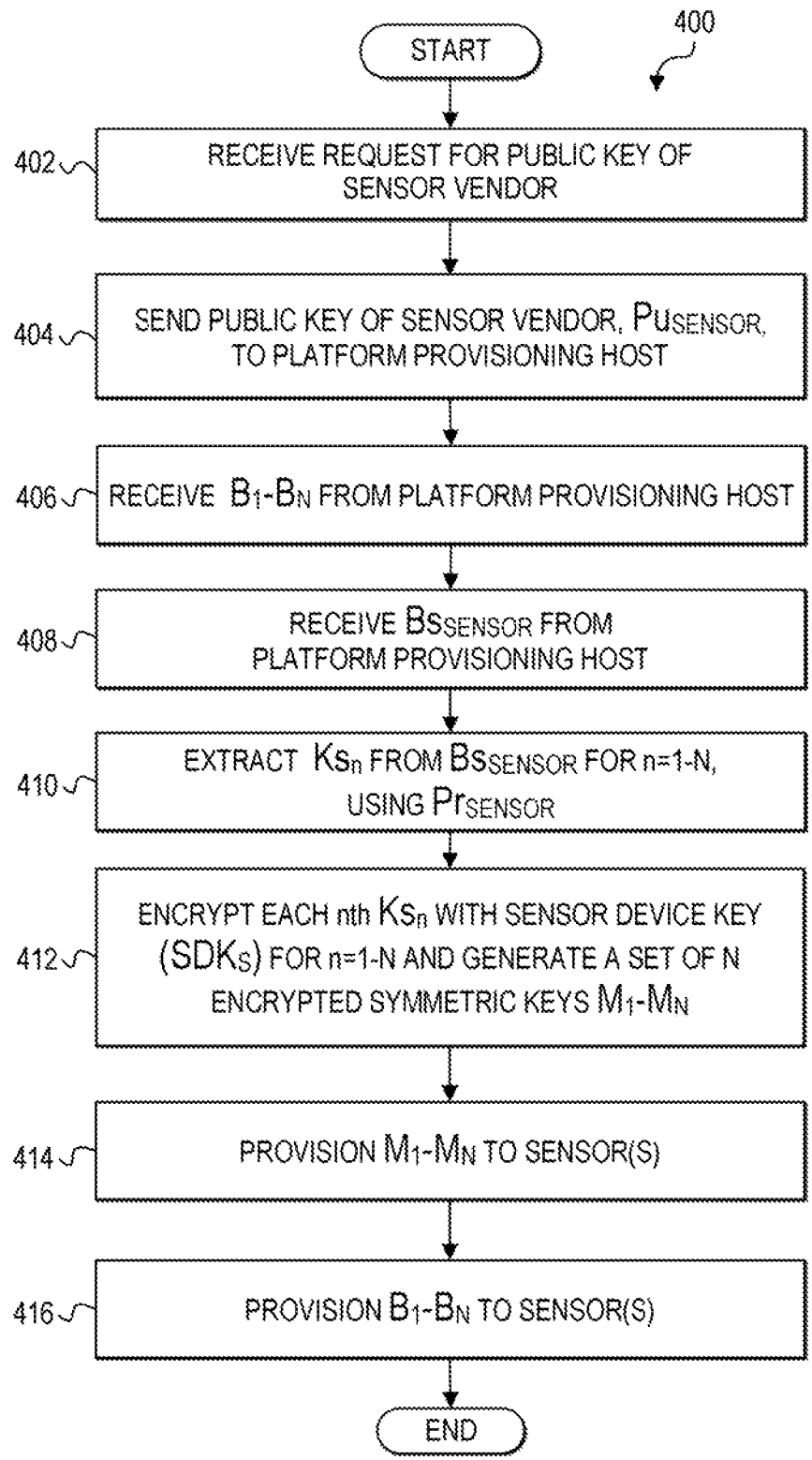
FIG. 4 is a simplified flow chart illustrating example operations associated with provisioning a sensor according to at least one embodiment.

FIGS. 3 and 4 are simplified flowcharts that illustrate possible activities occurring during the provisioning of a computing platform and a sensor. FIG. 3 is an example flowchart illustrating a possible flow 300 of operations associated with provisioning a computing platform (e.g., computing platform 140) in accordance with embodiments herein. In at least one embodiment, a set of operations corresponds to activities of FIG. 3. Platform provisioning host 120, or a portion thereof, may utilize at least a portion of the set of operations. Platform provisioning host 120 may comprise means such as processor 129, for performing the operations. In an embodiment, one or more operations of flow 300 may be performed by platform key generator 122, encryption engine 124, key injector 126, and/or communicator module 128.

At 302, the platform provisioning host generates a number, N, of public-private key pairs, which are represented as $Pu_n$ and Pr where n=1-N. Any one pair of the generated set of public-private key pairs can be used in asymmetric-key cryptography. At 304, the platform provisioning host generates N symmetric keys, which are represented herein by $Ks_1$-$Ks_N$. Any one of the N symmetric keys can be used in symmetric-key cryptography.

At 306, a public key of a public-private key pair associated with a sensor vendor is requested by the platform provisioning host. The platform provisioning host may request the public key from the sensor provisioning host, or from any other entity that can provide the public key associated with the sensor vendor. At 308, the public key of the sensor vendor, represented herein by $Pu_{SENSOR}$, is received by the platform provisioning host.

At 310, an asymmetric encryption algorithm is used to encrypt symmetric keys $Ks_1$-$Ks_N$, respectively, with public keys, $Pu_1$-$Pu_N$ of the public-private key pairs generated by the platform provisioning host. For example, for n=1-N, each $n^{th}$ Ks ($Ks_n$) is encrypted with an $n^{th}$ Pu ($Pu_n$) to generate a first set of N encrypted symmetric keys, which are represented herein by $B_1$-$B_N$.

At 312, an asymmetric encryption algorithm is used to encrypt each key of symmetric keys $KS_1$-$Ks_N$ with public key $Pu_{SENSOR}$ received from the sensor provisioning host to generate a second set of N encrypted symmetric keys. In another embodiment, a second set of N encrypted symmetric keys is generated by concatenating the symmetric keys and then using a symmetric encryption algorithm to encrypt the concatenated keys with an additional symmetric key that is generated. The additional symmetric key may then be encrypted using an asymmetric encryption algorithm and the sensor public key $Pu_{SENSOR}$. The second set of encrypted symmetric keys is represented herein by $Bs_{SENSOR}$.

At 314, the first set of encrypted symmetric keys $B_1$-$B_N$ is sent to sensor provisioning host 130. At 316, the second set of encrypted symmetric keys $Bs_{SENSOR}$ is sent to the sensor provisioning host.

At 318, public keys $Pu_1$-$Pu_N$ of the set of public-private key pairs generated by the platform provisioning host are cleared, deleted, purged, or otherwise made inaccessible.

At 320, a platform device key, represented herein by $PDK_P$, is obtained from computing platform being provisioned. In at least one embodiment, the key $PDK_P$ is unique among computing platforms and may be stored in protected memory (e.g., protected memory in a TEE) in the computing platform. At 322, private keys $Pr_1$-$Pr_N$ of the set of public-private key pairs generated by the platform provisioning host are each encrypted using a symmetric encryption algorithm and platform device key $PDK_P$ to generate a set of N encrypted private keys, represented herein by $EPr_1$-$EPr_N$. At 324, the set of encrypted private keys $EPr_1$-$EPr_N$ is provisioned on the computing platform. In one example, provisioning the set of encrypted private keys includes storing the set in protected memory (e.g., in a TEE) of the computing platform.

FIG. 4 is an example flowchart illustrating a possible flow 400 of operations associated with provisioning a sensor (e.g., sensor 160) in accordance with embodiments herein.

In at least one embodiment, a set of operations corresponds to activities of FIG. 4. Sensor provisioning host 130, or a portion thereof, may utilize at least a portion of the set of operations. Sensor provisioning host 130 may comprise means such as processor 139, for performing the operations. In an embodiment, one or more operations of flow 400 may be performed by decryption engine 132, encryption engine 134, key injector 136, and/or communicator module 138.

At 402, sensor provisioning host 130 receives a request from the platform provisioning host for the public key associated with the sensor vendor. At 404, the public key $Pu_{SENSOR}$ associated with the sensor vendor is sent to the platform provisioning host.

At 406, the sensor provisioning host receives the first set of encrypted symmetric keys $B_1$-$B_N$ that were generated by the platform provisioning host. At 408, the sensor provisioning host receives the second set of encrypted symmetric keys that were generated by the platform provisioning host $Bs_{SENSOR}$.

At 410, symmetric keys $Ks_1$-$Ks_N$ are extracted from the second set of encrypted symmetric keys $Bs_{SENSOR}$. In one embodiment, where the second set of encrypted symmetric keys $Bs_{SENSOR}$ is generated as a set of individually encrypted keys, symmetric keys $Ks_1$-$Ks_N$ can be extracted by using an asymmetric decryption algorithm and sensor private key $Pr_{SENSOR}$ to decrypt each encrypted symmetric key. In another embodiment, where the second set of encrypted symmetric keys $Bs_{SENSOR}$ is generated in a single encrypted key, symmetric keys $Ks_1$-$Ks_N$ can be extracted by using an asymmetric encryption algorithm and the sensor private key $Pr_{SENSOR}$ to decrypt the encrypted additional symmetric key. The extracted additional symmetric key can then be used with a symmetric encryption algorithm to decrypt the second set of encrypted symmetric keys $Bs_{SENSOR}$, which is embodied as a single encrypted key.

At 412, symmetric keys $Ks_1$-$Ks_N$ are encrypted using symmetric-key cryptography and a sensor device key $SDK_S$. For example, for n=1-N, each nth Ks ($Ks_n$) is encrypted by using a symmetric encryption algorithm and sensor device key $SDK_S$ to generate a third set of N encrypted symmetric keys, which is represented herein by $M_1$-$M_N$.

At 414, the third set of N encrypted symmetric keys $M_1$-$M_N$ is provisioned on the sensor. In one example, provisioning the third set of encrypted private keys includes embedding them in firmware of the sensor. At 416, the first set of encrypted symmetric keys $B_1$-$B_N$ is provisioned on the sensor. In one example, provisioning the first set of encrypted symmetric keys includes embedding them in firmware of the sensor.

Figure 5:
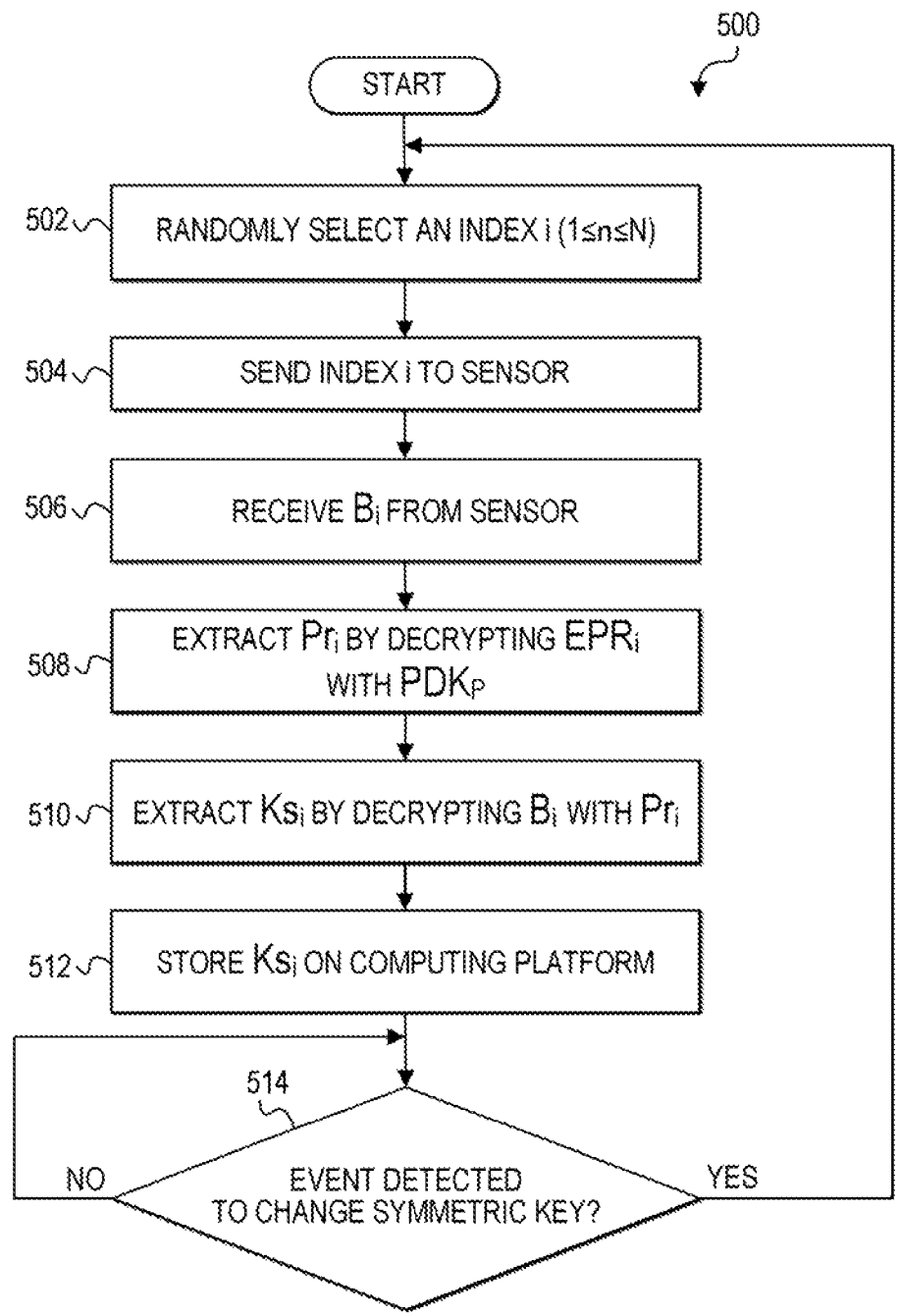
FIG. 5 is a simplified flow chart illustrating example operations associated with a computing platform at runtime according to at least one embodiment.
Figure 6:
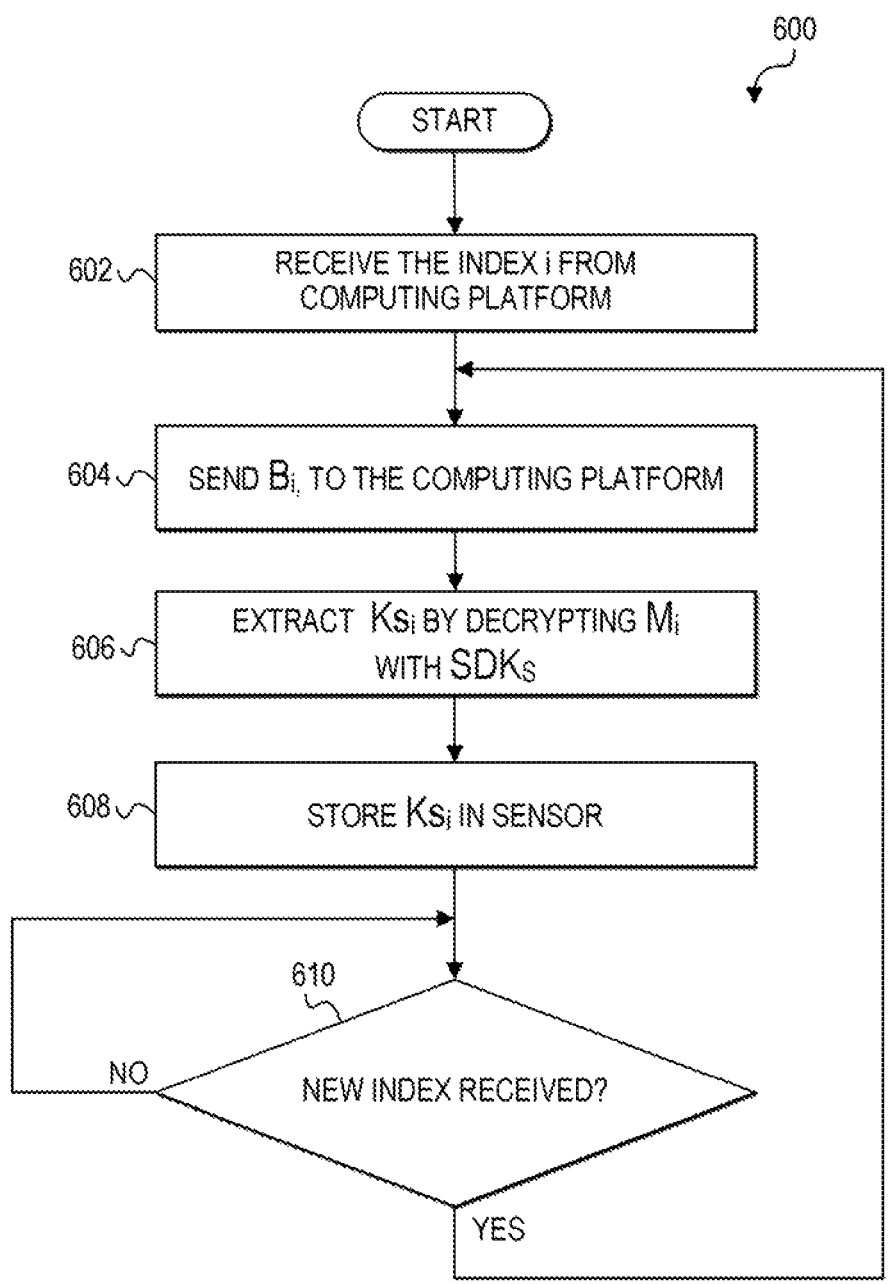
FIG. 6 is a simplified flow chart illustrating example operations associated with a sensor at runtime according to at least one embodiment.

FIGS. 5 and 6 are simplified flowcharts that illustrate possible activities occurring during runtime of a device implemented with a computing platform and a sensor, both of which are provisioned in accordance with embodiments described herein. FIG. 5 is an example flowchart illustrating a possible flow 500 of operations associated with a provisioned computing platform (e.g., computing platform 140) in device 200 during runtime in accordance with embodiments herein. In at least one embodiment, a set of operations corresponds to activities of FIG. 5. Computing platform 140, or a portion thereof, may utilize at least a portion of the set of operations. Computing platform 140 may comprise means such as processor 149, for performing the operations. In an embodiment, one or more operations of flow 400 may be performed by trusted symmetric key generator 152 and/or decryption engine 154.

Flow 500 may begin when computing platform 140 boots up, and potentially at other times depending on the particular implementation, as will be further described herein. At 502, an index i is randomly selected. The index i is less than or equal to the number of symmetric keys generated by platform provisioning host 120. If an index was previously selected and a new index is being selected, then the new index i may be assigned any number n that is less than or equal to the number of symmetric keys generated by platform provisioning host ($1 \leq n \leq N$) and that is not one of the previously selected indexes. At 504, the index i is sent to the sensor.

At 506, an encrypted symmetric key $B_i$, which is indexed by index i in the first set of encrypted symmetric keys $B_1$-$B_N$, is received from the sensor. For example, if N=3096 and index i=4, then $B_4$ is received, which may be the fourth key of 3096 keys in the first set of encrypted symmetric keys.

At 508, an encrypted private key $EPr_i$, which is indexed by i in the set of encrypted private keys $EPr_1$-$EPr_N$ stored in protected memory of the computing platform, is identified. Private key $Pr_i$ is extracted from the encrypted private key $EPr_i$ by using a symmetric decryption algorithm and platform device key $PDK_P$. The symmetric decryption algorithm corresponds to the symmetric decryption algorithm applied by platform provisioning host at 322.

At 510, trusted symmetric key $Ks_i$ is extracted from the encrypted symmetric key $B_i$ by using an asymmetric decryption algorithm and extracted private key $Pr_i$. The asymmetric encryption algorithm corresponds to the asymmetric encryption algorithm applied by platform provisioning host at 310. At 512, the trusted symmetric key $Ks_i$ is stored on the computing platform. In one example, the $Ks_i$ is stored in protected memory (e.g., associated with a TEE) on the computing platform.

Flow 500 may be configured to cause a new symmetric key to be obtained based on any number of different circumstances according to particular needs and implementations. In at least some embodiments, the computing platform monitors possible events and if a particular event is detected at 514, then flow may continue at 502, where a new index i is selected and subsequent operations are performed to generate a new trusted symmetric key to be used for decrypting data received from the sensor. If no event is detected at 514, however, then monitoring may continue for the particular events. Events can include, but are not necessarily limited to, one or more of 1) receipt of input data from the sensor (e.g., each time a user tries to authenticate himself or herself), 2) expiration of time period or interval (e.g., once a day, every hour, etc.), and/or 3) compromised trusted symmetric key $Ks_i$ stored in computing platform.

FIG. 6 is an example flowchart illustrating a possible flow 600 of operations associated with a provisioned sensor (e.g., sensor 160) in device 200 during runtime in accordance with embodiments herein. In at least one embodiment, a set of operations corresponds to activities of FIG. 6. Sensor 160, or a portion thereof, may utilize at least a portion of the set of operations. Sensor 160 may comprise means such as processor 169, for performing the operations. In at least some embodiments, processor 169 may be a microprocessor. In an embodiment, one or more operations of flow 600 may be performed by trusted symmetric key generator 172 and/or decryption engine 174.

At 600, an index i is received from the computing platform. At 604, an encrypted symmetric key $B_i$, which is indexed by index i in the first set of encrypted symmetric keys $B_1$-$B_N$ embedded in the sensor, is identified and retrieved. The encrypted symmetric key $B_i$ is then sent to the computing platform.

At 606, encrypted symmetric key $M_i$, which is indexed by index i in the set of encrypted symmetric keys $M_1$-$M_N$ embedded in the sensor, is identified and retrieved. Trusted symmetric key $Ks_i$ is extracted from encrypted symmetric key $M_i$ by using a symmetric decryption algorithm and sensor device key $SDK_S$. At 608, the trusted symmetric key $Ks_i$ is stored on the sensor. In one example, the $Ks_i$ is stored in sensor hardware that is usable by the firmware of the sensor. In one possible implementation, the sensor hardware exposes a service to the firmware for using $Ks_i$, but the firmware is not configured to read or print out the $Ks_i$.

The stored trusted symmetric key $Ks_i$ may be used by the sensor for encrypting input data that is detected by the sensor and provided to the computing platform. However, the computing platform may initiate establishing a new trusted symmetric key at the computing platform and the sensor based on one or more particular events as previously described herein. Accordingly, if the sensor receives a new index i, as determined at 610, then flow 600 may continue at 604 in order for the sensor to establish a new trusted symmetric key $Ks_i$, and to enable the computing platform to establish a corresponding new trusted symmetric key.

Figure 7:
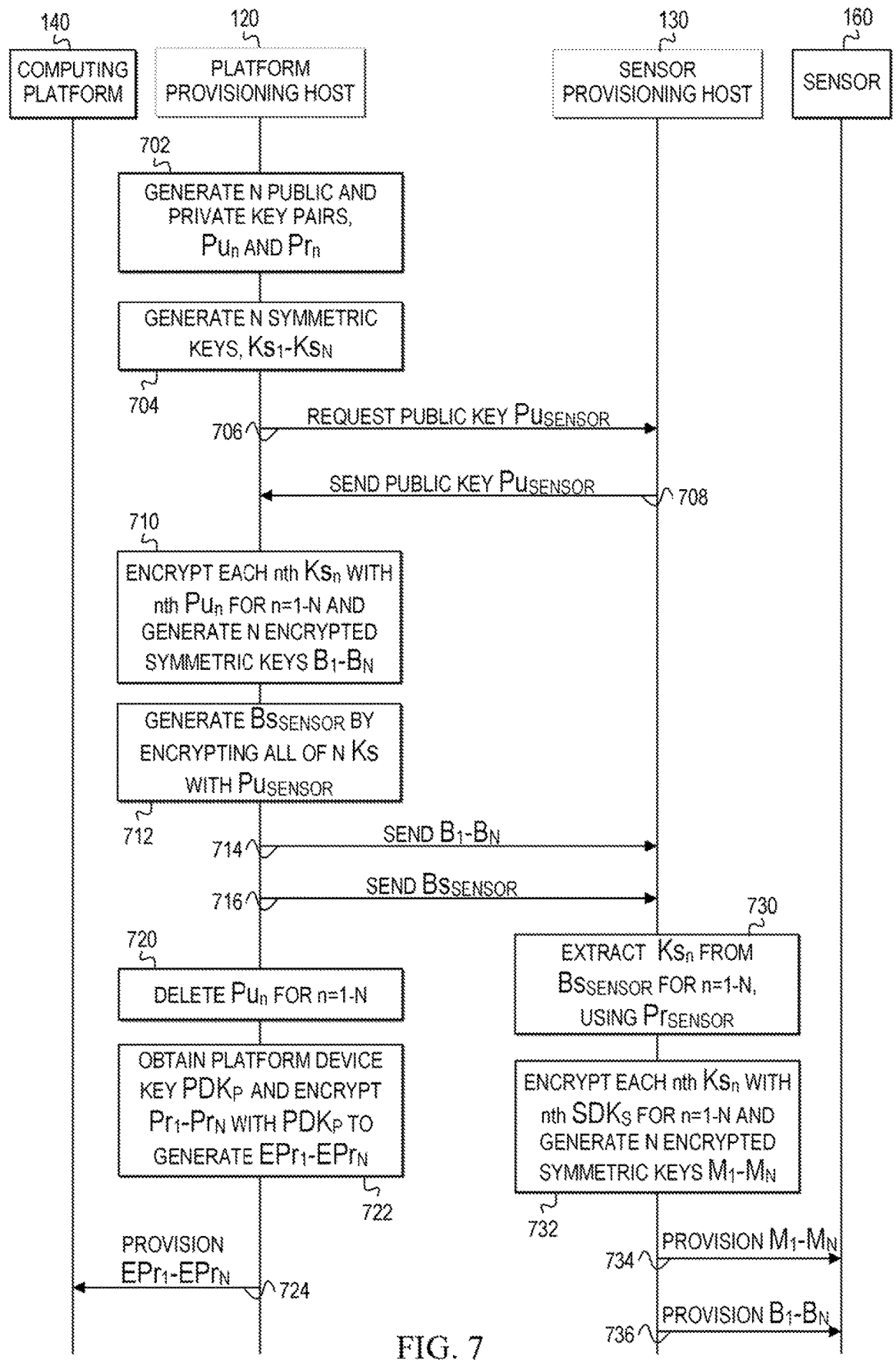
FIG. 7 is a simplified interaction diagram illustrating example interactions and operations of the provisioning of a computing platform and a sensor according to at least one embodiment.

FIG. 7 is a simplified interaction diagram that illustrates possible interactions and operations during the provisioning of a computing platform and a sensor, such as computing platform 140 and sensor 160. FIG. 7 illustrates potential interactions between platform provisioning host 120 and computing platform 140, between sensor provisioning host 130 and sensor 160, and between platform provisioning host 120 and sensor provisioning host 130. The operations illustrated in FIG. 7 occur on platform provisioning host 120 or sensor provisioning host 130.

At 702, platform provisioning host 120 generates a number, N, of public-private key pairs $Pu_n$ and $Pr_n$ where n=1-N. At 704, platform provisioning host 120 generates N symmetric keys $Ks_1$-$Ks_N$. Any one of the N symmetric keys can be used in symmetric-key cryptography.

At 706, platform provisioning host 120 sends a request to sensor provisioning host 130 for a public key of a public-private key pair associated with the sensor's vendor (e.g., manufacturer/maker/producer of the sensor). At 708, sensor provisioning host 130 sends its public key $Pu_{SENSOR}$ to platform provisioning host 120.

At 710, platform provisioning host 120 encrypts symmetric keys $Ks_1$-$Ks_N$ by using an asymmetric encryption algorithm and public keys, $Pu_1$-$Pu_N$, respectively. For example, for n=1-N, each $n^{th}$ Ks ($Ks_n$) is encrypted by using an asymmetric encryption algorithm and an $n^{th}$ Pu ($Pu_n$) to generate a first set of N encrypted symmetric keys $B_1$-$B_N$.

At 712, platform provisioning host 120 encrypts symmetric keys $Ks_1$-$Ks_N$ using an asymmetric encryption algorithm and the sensor's public key $Pu_{SENSOR}$. In one embodiment, platform provisioning host 120 generates a second set of N encrypted symmetric keys $Bs_{SENSOR}$ by encrypting each symmetric key using an asymmetric encryption algorithm and public key $Pu_{SENSOR}$. In another embodiment, platform provisioning host 120 generates a second set of N encrypted symmetric keys $Bs_{SENSOR}$ by concatenating the symmetric keys and then encrypting the concatenated keys. In this scenario, an additional symmetric key may be generated and used with a symmetric encryption algorithm to encrypt the concatenated keys. The additional symmetric key may then be encrypted using an asymmetric encryption algorithm and the sensor's public key $Pu_{SENSOR}$.

At 714, platform provisioning host 120 sends the first set of encrypted symmetric keys $B_1$-$B_N$ to sensor provisioning host 130. At 716, platform provisioning host 120 sends the second set of encrypted symmetric keys $Bs_{SENSOR}$ to sensor provisioning host 130.

At 720, platform provisioning host 120 deletes public keys $Pu_1$-$Pu_N$ of the set of public-private key pairs generated by platform provisioning host 120.

At 722, platform provisioning host 120 identifies and retrieves a platform device key $PDK_P$ from computing platform 140, which is stored in the computing platform. Platform provisioning host 120 encrypts each private key of private keys $Pr_1$-$Pr_N$ using a symmetric encryption algorithm and platform device key $PDK_P$ to generate a set of N encrypted private keys $EPr_1$-$EPr_N$.

At 724, the set of encrypted private keys $EPr_1$-$EPr_N$ are provisioned on computing platform 140. In one example, provisioning the set of encrypted private keys includes storing the set in protected memory (e.g., in a TEE) of the computing platform.

Operations and interactions shown at 730-738 may occur at least partially concurrently with, prior to, or after the operations and interactions shown at 720-724. At 730, sensor provisioning host 130 extracts symmetric keys $Ks_1$-$Ks_N$ from the second set of encrypted symmetric keys $Bs_{SENSOR}$. In one embodiment, where the second set of encrypted symmetric keys $Bs_{SENSOR}$ is generated as a set of individually encrypted keys, symmetric keys $Ks_1$-$Ks_N$ can be extracted by using an asymmetric decryption algorithm and the sensor's private key $Pr_{SENSOR}$ to decrypt each encrypted symmetric key. In another embodiment, where the second set of encrypted symmetric keys $Bs_{SENSOR}$ is generated in a single encrypted key, symmetric keys $Ks_1$-$Ks_N$ can be extracted by performing both asymmetric and symmetric decryption. First, an asymmetric decryption algorithm and the sensor's private key $Pr_{SENSOR}$ is used to extract the additional symmetric key from the encrypted additional symmetric key. Then, a symmetric decryption algorithm is used with the extracted additional symmetric key to extract symmetric keys $Ks_1$-$Ks_N$ from the second set of encrypted symmetric keys $Bs_{SENSOR}$, which is embodied as a single encrypted key. The decryption algorithm(s) correspond to the appropriate encryption algorithm(s) used by platform provisioning host 120 at 712.

At 732, sensor provisioning host 130 encrypts extracted symmetric keys $Ks_1$-$Ks_N$ by using a symmetric encryption algorithm and a sensor device key $SDK_S$. For example, for n=1-N, each $n^{th}$ Ks ($Ks_n$) is encrypted using a symmetric encryption algorithm and the sensor device key $SDK_S$ to generate a third set of N encrypted symmetric keys $M_1$-$M_N$.

At 734, sensor provisioning host 130 provisions the third set of encrypted symmetric keys $M_1$-$M_N$ on sensor 160. In one example, provisioning the third set of encrypted symmetric keys $M_1$-$M_N$ includes embedding them in firmware of sensor 160. At 736, sensor provisioning host 130 provisions the first set of encrypted symmetric keys $B_1$-$B_N$ on sensor 160. In one example, provisioning the first set of encrypted symmetric keys $B_1$-$B_N$ includes embedding them in firmware of sensor 160.

Figure 8:
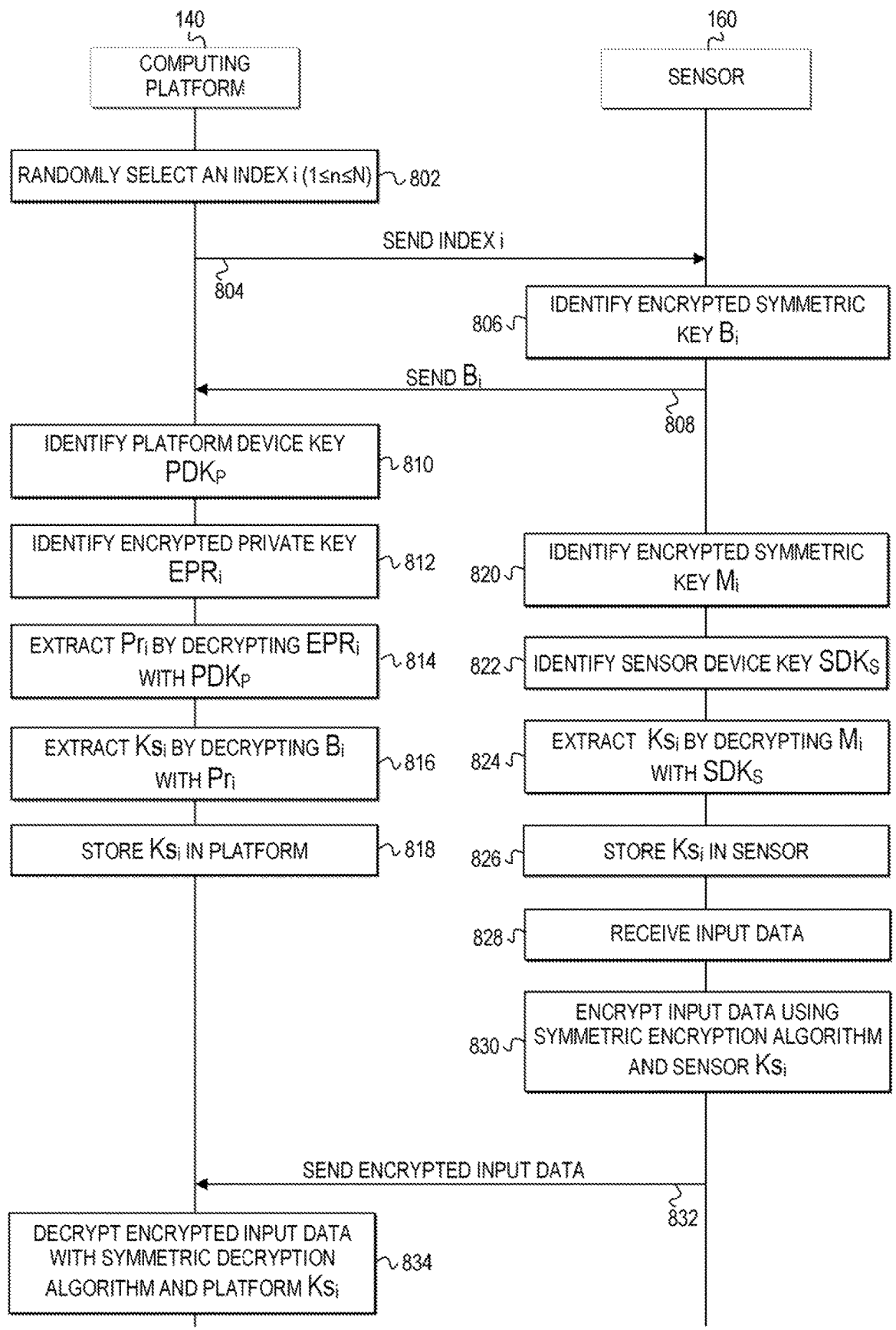
FIG. 8 is a simplified interaction diagram illustrating example interactions and operations at runtime of a device implemented with a computing platform and a sensor according to at least one embodiment.

FIG. 8 is a simplified interaction diagram that illustrates possible interactions and operations during runtime of an embodiment of a device, such as device 200, implemented with a provisioned computing platform and a provisioned sensor, such as computing platform 140 and sensor 160. FIG. 8 illustrates potential communications between components of device 200, including computing platform 140 and sensor 160. The operations and interactions of FIG. 8 show an example flow that may occur subsequent to computing platform 140 and sensor 160 being provisioned (e.g., as shown in FIG. 7), and then implemented in device 200.

At 802, computing platform 140 randomly selects an index i. The index i is less than or equal to the number of symmetric keys generated by platform provisioning host 120. If an index was previously selected and a new index is being selected, then the new index i may be assigned any number n that is less than or equal to the number of symmetric keys generated by platform provisioning host 120 ($1 \leq n \leq N$) and that is not one of the previously selected indexes. At 804, computing platform 140 sends the index i to sensor 160.

At 806, sensor 160 identifies an encrypted symmetric key $B_i$, which is indexed by index i in the first set of encrypted symmetric keys $B_1$-$B_N$ embedded in the sensor. At 808, sensor 160 sends encrypted symmetric key $B_i$ to computing platform 140.

At 810, computing platform 140 identifies platform device key $PKD_P$, which is stored in the computing platform. At 812, computing platform 140 identifies encrypted private key $EPr_i$, which is indexed by index i in the set of encrypted private keys $EPr_1$-$EPr_N$, which may be stored in protected memory of the computing platform.

At 814, computing platform 140 extracts private key $Pr_i$ by using a symmetric encryption algorithm and platform device key $PDK_P$ to decrypt $EPr_i$. At 816, computing platform 140 extracts symmetric key $Ks_i$ from encrypted symmetric key $B_i$ by using an asymmetric encryption algorithm and extracted private key $Pr_i$ to decrypt $B_i$. At 818, computing platform 140 stores extracted symmetric key $Ks_i$ on the computing platform. In one example, $Ks_i$ is stored in protected memory (e.g., associated with a TEE) on the computing platform.

Operations 810-818 of computing platform 140 may occur at least partially concurrently with, prior to, or after operations 820-826 of sensor 160. At 820, sensor 160 identifies encrypted symmetric key $M_i$, which is indexed by index i in the set of encrypted symmetric keys $M_1$-$M_N$ embedded in the sensor. At 822, sensor 160 identifies sensor device key $SDK_S$ embedded in the sensor.

At 824, sensor 160 extracts trusted symmetric key $Ks_i$ by using a symmetric encryption algorithm and sensor device key $SDK_S$ to decrypt encrypted symmetric key $M_i$. At 826, sensor 160 stores trusted symmetric key $Ks_i$ on the sensor. In one example, $Ks_i$ is stored in the firmware of the sensor.

It should be apparent that the trusted symmetric key extracted by computing platform 140 corresponds to the trusted symmetric key extracted by sensor 160. Accordingly, once the trusted symmetric keys are obtained in computing platform 140 and sensor 160, symmetric-key cryptography can be used to encrypt, with the symmetric key stored in sensor 160, data being communicated from the sensor to computing platform 140. Symmetric-key cryptography may also be used to decrypt, with the symmetric key stored in computing platform 140, encrypted data received from the sensor.

As shown by way of example in FIG. 8, at 828, sensor 160 detects input data (e.g., fingerprint input data, voice input signals, facial feature data, etc.). At 830, sensor 160 encrypts the input data using a symmetric encryption algorithm and trusted symmetric key $Ks_i$ stored on the sensor. At 832, sensor 160 sends the encrypted input data to computing platform 140. At 834, computing platform 140 extracts the input data by decrypting the received encrypted input data using a symmetric decryption algorithm and trusted symmetric key $Ks_i$ stored in protected memory on the computing platform. Thus, input data detected by a sensor is protected when it is communicated from the sensor to the associated computing platform.

FIGS. 9-12 detail exemplary architectures and systems to implement embodiments of the above (such as platform provisioning host 120, sensor provisioning host 130, computing platform 140, sensor 160, device 200, etc.). In some embodiments, one or more hardware components and/or instructions described above are emulated as detailed below, or implemented as software modules. Other computer architecture designs known in the art for processors, mobile devices, computing systems, and components thereof may also (or alternatively) be used. Generally, suitable computer architectures for embodiments disclosed herein can include, but are not limited to, configurations illustrated in FIGS. 9-12.

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. An exemplary processor core is described next followed by computer architectures.

Figure 9:
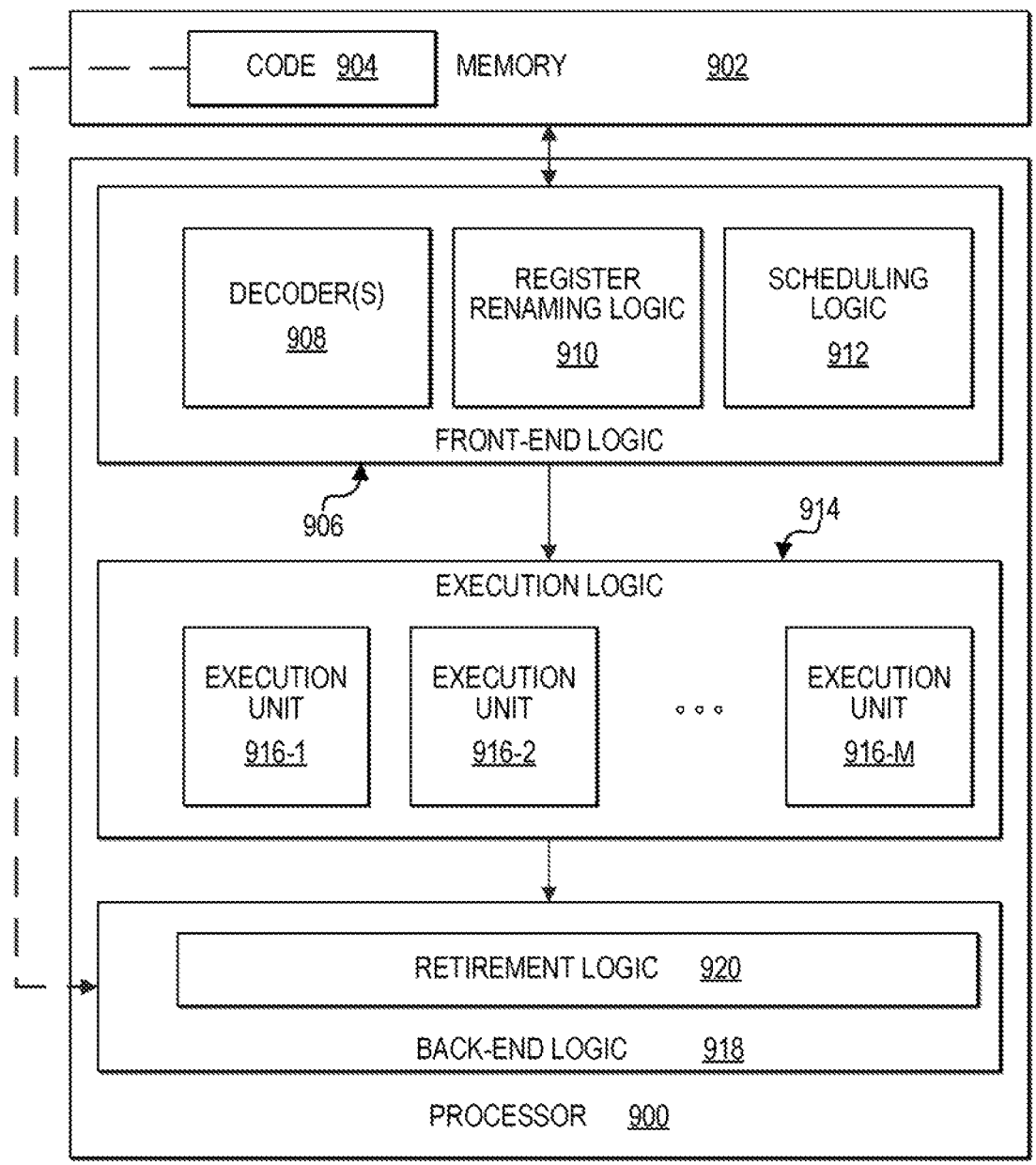
FIG. 9 is a block diagram illustrating an example processor core and memory according to at least one embodiment.

FIG. 9 is an example illustration of a processor according to an embodiment. Processor 900 is one example embodiment of processors that may be used in embodiments herein such as processors 129, 139, 149, and 169. Processor 900 may be any type of processor, such as a microprocessor, an embedded processor, a digital signal processor (DSP), a network processor, a multi-core processor, a single core processor, or other device to execute code. Although only one processor 900 is illustrated in FIG. 9, a processing element may alternatively include more than one of processor 900 illustrated in FIG. 9. Processor 900 may be a single-threaded core or, for at least one embodiment, the processor 900 may be multi-threaded in that it may include more than one hardware thread context (or "logical processor") per core.

FIG. 9 also illustrates a memory 902 coupled to processor 900 in accordance with an embodiment. Memory 902 is one example of memory elements 127, 137, 147, and 167. Memory 902 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM). Processor 900 can execute any type of instructions associated with the monitoring and analyzing operations detailed herein. Generally, processor 900 can transform an element or an article (e.g., data) from one state or thing to another state or thing.

Code 904, which may be one or more instructions to be executed by processor 900, may be stored in memory 902. Code 904 can include instructions of various modules (e.g., platform key generator 122, encryption engines 124, key injector 126, communicator module 128, decryption engine 132, encryption engine 134, key injector 136, communicator module 138, trusted symmetric key generator 152, decryption engine 154, trusted symmetric key generator 172, decryption engine 174, etc.) that may be stored in software, hardware, firmware, or any suitable combination thereof, or in any other internal or external component, device, element, or object where appropriate and based on particular needs. In one example, processor 900 can follow a program sequence of instructions indicated by code 904. Each instruction enters a front-end logic 906 and is processed by one or more decoders 908. The decoder may generate, as its output, a micro operation such as a fixed width micro operation in a predefined format, or may generate other instructions, microinstructions, or control signals that reflect the original code instruction. Front-end logic 906 also includes register renaming logic 910 and scheduling logic 912, which generally allocate resources and queue the operation corresponding to the instruction for execution.

Processor 900 can also include execution logic 914 having a set of execution units 916-1 through 916-M. Some embodiments may include a number of execution units dedicated to specific functions or sets of functions. Other embodiments may include only one execution unit or one execution unit that can perform a particular function. Execution logic 914 performs the operations specified by code instructions.

After completion of execution of the operations specified by the code instructions, back-end logic 918 can retire the instructions of code 904. In one embodiment, processor 900 allows out of order execution but requires in order retirement of instructions. Retirement logic 920 may take a variety of known forms (e.g., re-order buffers or the like). In this manner, processor 900 is transformed during execution of code 904, at least in terms of the output generated by the decoder, hardware registers and tables utilized by register renaming logic 910, and any registers (not shown) modified by execution logic 914.

Although not shown in FIG. 9, a processing element may include other elements on a chip with processor 900. For example, a processing element may include memory control logic along with processor 900. The processing element may include I/O control logic and/or may include I/O control logic integrated with memory control logic. The processing element may also include one or more caches. In some embodiments, non-volatile memory (such as flash memory or fuses) may also be included on the chip with processor 900.

Figure 10:
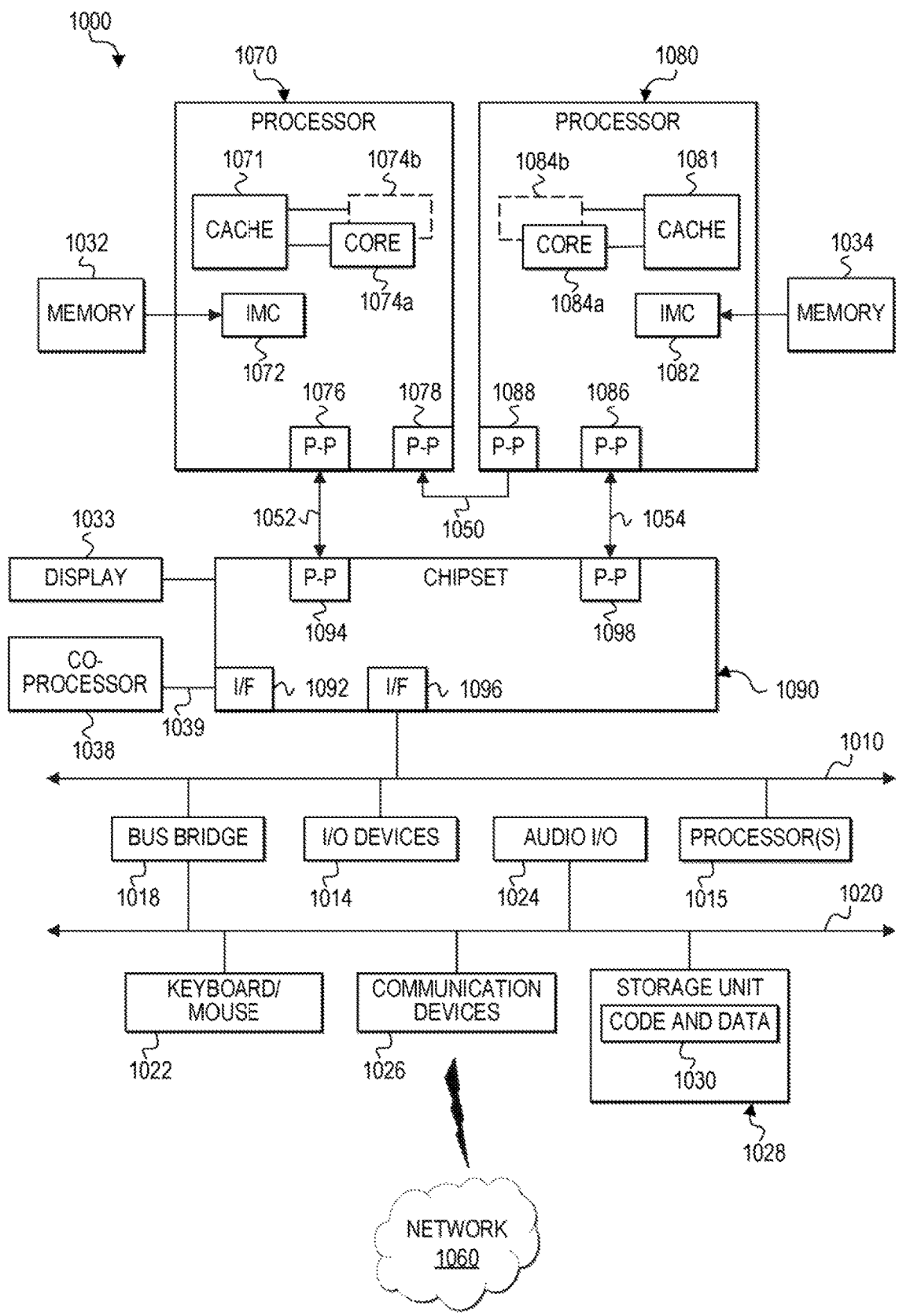
FIG. 10 is a block diagram of an example computer architecture according to at least one embodiment.
Figure 11:
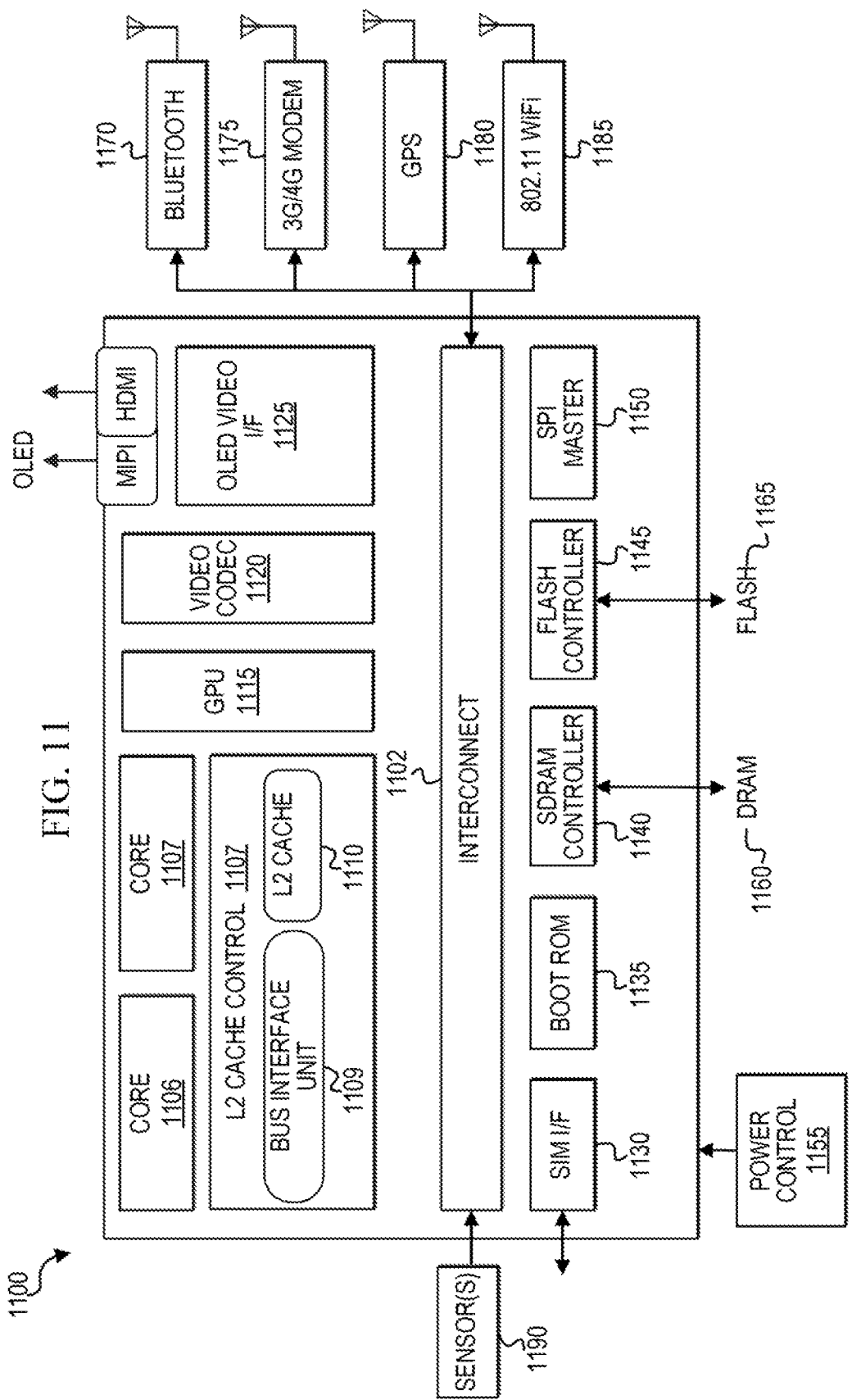
FIG. 11 is a block diagram of an example system-on-a-chip (SoC) computer architecture according to at least one embodiment.
Figure 12:
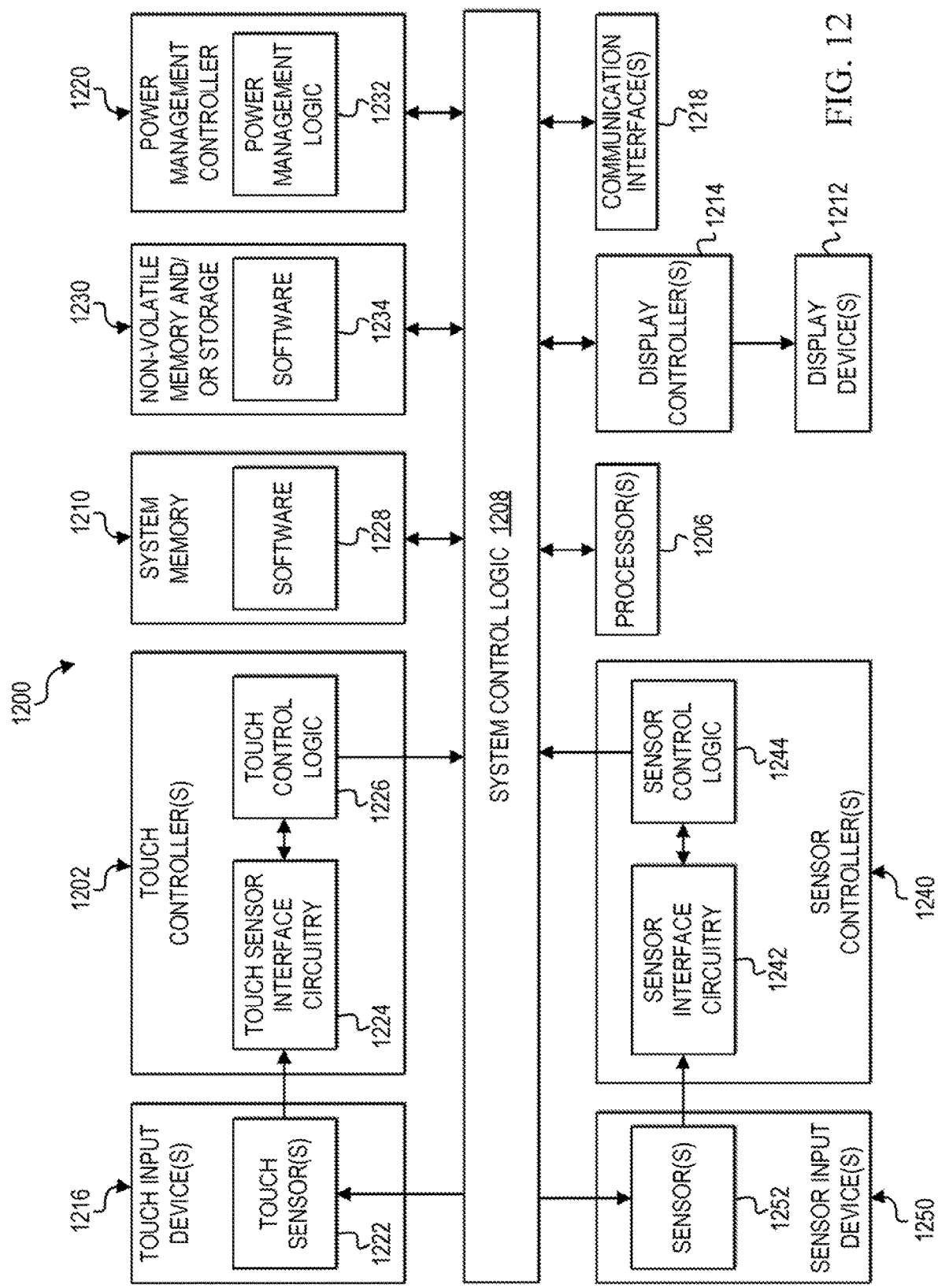
FIG. 12 is a simplified block diagram illustrating computer architecture and logic according to at least one embodiment.

FIGS. 10-12 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, smart phones, mobile devices, wearable electronic devices, portable media players, hand held devices, and various other electronic devices, are also suitable. In general, a huge variety of systems or electronic devices capable of incorporating a processor and/or other execution logic as disclosed herein are generally suitable.

Referring now to FIG. 10, shown is a block diagram of an example system 1000 in accordance with one or more embodiments of the present disclosure. As shown in FIG. 10, multiprocessor system 1000 is a point-to-point interconnect system, and includes a first processor 1070 and a second processor 1080 coupled via a point-to-point interconnect 1050. In at least one embodiment, platform provisioning host 120, sensor provisioning host 130, and/or device 200, shown and described herein, may be configured in the same or similar manner as exemplary computing system 1000. Processors 1070 and 1080 may be any type of processor, such as those discussed with reference to processors 129 and 139 of FIG. 1, and processors 149 and 169 of FIG. 2, and processor 900 of FIG. 9.

Processors 1070 and 1080 may be implemented as single core processors 1074a and 1084a or multi-core processors 1074a-1074b and 1084a-1084b. Processors 1070 and 1080 may each include a cache 1071 and 1081 used by their respective core or cores. A shared cache (not shown) may be included in either processors or outside of both processors, yet connected with the processors via P-P interconnect, such that either or both processors' local cache information may be stored in the shared cache if a processor is placed into a low power mode.

Processors 1070 and 1080 are shown including integrated memory controller (IMC) units 1072 and 1082, respectively. IMCs 1072 and 1082 couple the processors to respective memories, namely a memory 1032 and a memory 1034, which may be portions of main memory locally attached to the respective processors. In alternative embodiments, memory controller logic 1072 and 1082 may be discrete logic separate from processors 1070 and 1080. Memory elements 1032 and/or 1034 may store various data to be used by processors 1070 and 1080 in achieving operations associated with securely sharing keys between a sensor and a computing platform using symmetric key cryptography, as outlined herein.

Processor 1070 also includes as part of its bus controller units, point-to-point (P-P) interfaces 1076 and 1078; similarly, second processor 1080 includes P-P interfaces 1086 and 1088. Processors 1070, 1080 may exchange information via a point-to-point (P-P) interface 1050 using P-P interface circuits 1078, 1088. Processors 1070, 1080 may each exchange information with a chipset 1090 via individual P-P interfaces 1052, 1054 using point to point interface circuits 1076, 1094, 1086, 1098. Chipset 1090 may optionally exchange information with the coprocessor 1038 via a high-performance interface 1039. In one embodiment, the coprocessor 1038 is a special-purpose processor, such as, for example, a high-throughput MIC processor, a network or communication processor, compression engine, graphics processor, GPGPU, embedded processor, or the like. Chipset 1090 may also communicate with a display 1033 for displaying data that is viewable by a human user.

As shown herein, chipset 1090 is separated from processing elements 1070 and 1080. However, in an embodiment, chipset 1090 is integrated on the same chip as processing elements 1070 and 1080. Also, chipset 1090 may be partitioned differently with fewer or more integrated circuits.

Chipset 1090 may be coupled to a first bus 1010 via an interface 1096. In one embodiment, first bus 1010 may be a Peripheral Component Interconnect (PCI) bus, or a bus such as a PCI Express bus or another third generation I/O interconnect bus, although the scope of the present disclosure is not so limited.

As shown in FIG. 10, various I/O devices 1014 may be coupled to first bus 1010, along with a bus bridge 1018 which couples first bus 1010 to a second bus 1020. In one embodiment, one or more additional processor(s) 1015, such as coprocessors, high-throughput MIC processors, GPGPU's, accelerators (such as, e.g., graphics accelerators or digital signal processing (DSP) units), field programmable gate arrays, or any other processor, are coupled to first bus 1010. I/O devices 1014 may include peripheral devices (including sensors) that provide information and/or instructions to processors 1070 and 1080 for processing or storage. Some peripheral devices also (or alternatively) provide a way for processors 1070 and 1080 to output information to users or other computing systems. Sensors may include, for example, video and/or still image sensors, audio sensors, touch sensors, fingerprint sensors, eye sensors, facial features sensors, other biometric sensors, etc. In one example, sensors detect user authentication input and in accordance with at least one embodiment, encrypt the input using the current symmetric key, and provide the symmetric-key encrypted user authentication input to processors 1070 and 1080.

In one embodiment, second bus 1020 may be a low pin count (LPC) bus. Various devices may be coupled to a second bus 1020 including, for example, a keyboard and/or mouse 1022 (or other input devices such as a touch screen, trackball, joystick, etc.), communication devices 1026 (such as modems, network interface devices, or other types of communication devices that may communicate through a network 1060), and a storage unit 1028 such as a disk drive or other mass storage device which may include instructions/code and data 1030, in one embodiment. Further, an audio I/O 1024 may be coupled to the second bus 1020. Note that other architectures are possible. For example, instead of the point-to-point architecture of FIG. 10, a system may implement a multi-drop bus or other such architecture.

The computing system depicted in FIG. 10 is a schematic illustration of an embodiment that may be utilized to implement various embodiments discussed herein. It will be appreciated that various components of the system depicted in FIG. 10 may be combined in a system-on-a-chip (SoC) architecture or in any other suitable configuration capable of achieving the protection of communications between a sensor and a computing platform using symmetric key cryptography, according to the various embodiments provided herein.

Turning to FIG. 11, FIG. 11 is a simplified block diagram associated with an example Advanced RISC Machines (ARM) ecosystem system-on-chip (SOC) 1100 of the present disclosure. At least one example implementation of the present disclosure can include the communication protection using symmetric-key cryptography features discussed herein and an ARM component. For example, in at least some embodiments, device 200, shown and described herein, could be configured in the same or similar manner ARM ecosystem SOC 1100. Further, the architecture can be part of any type of tablet, smartphone (inclusive of Android™ phones, iPhones™), iPad™, Google Nexus™, Microsoft Surface™, personal computer, server, video processing components, laptop computer (inclusive of any type of notebook), Ultrabook™ system, wearable electronic device, any type of touch-enabled input device, etc.

In this example of FIG. 11, ARM ecosystem SOC 1100 may include multiple cores 1106-1107, an L2 cache control 1107, a bus interface unit 1109, an L2 cache 1110, a graphics processing unit (GPU) 1115, an interconnect 1102, a video codec 1120, and an organic light emitting diode (OLED) I/F 1125, which may be associated with mobile industry processor interface (MIPI)/high-definition multimedia interface (HDMI) links that couple to an OLED display.

ARM ecosystem SOC 1100 may also include a subscriber identity module (SIM) I/F 1130, a boot read-only memory (ROM) 1135, a synchronous dynamic random access memory (SDRAM) controller 1140, a flash controller 1145, a serial peripheral interface (SPI) master 1150, a suitable power control 1155, a dynamic RAM (DRAM) 1160, flash 1165, and one or more sensors 1190. In addition, one or more example embodiments include one or more communication capabilities, interfaces, and features such as instances of Bluetooth™ 1170, a 3G modem 1175, a global positioning system (GPS) 1180, and an 802.11 Wi-Fi 1185.

In operation, the example of FIG. 11 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Turning to FIG. 12, FIG. 12 is a simplified block diagram illustrating potential electronics and logic that may be associated with one or more embodiments of device 200 discussed herein. Certain electronics and logic of FIG. 12 can be discrete or integrated into a converged mobility platform such as a System on a Chip (SOC) as disclosed for example with reference to FIG. 11. Alternatively, certain electronics and logic of FIG. 12 can be discrete or integrated into a big core platform such as a computing system as disclosed for example with reference to FIG. 10. Example implementations could include, but are not necessarily limited to, mobile phones, tablets, phablets, gaming systems, infotainment systems, laptops, desktops, wearable electronic devices, other electronic devices disclosed herein, etc.

In at least one example embodiment, system 1200 can include touch controller(s) 1202, sensor input controller(s) 1240, one or more processors 1206, system control logic 1208 coupled to at least one of processor(s) 1206, system memory 1210 coupled to system control logic 1208, non-volatile memory and/or storage device(s) 1230 coupled to system control logic 1208, display controller(s) 1214 coupled to system control logic 1208 and to display device(s) 1212, power management controller 1220 coupled to system control logic 1208, and/or communication interfaces 1218 coupled to system control logic 1208.

System control logic 1208, in at least one embodiment, can include any suitable interface controllers to provide for any suitable interface to at least one processor 1206 and/or to any suitable device or component in communication with system control logic 1208. System control logic 1208, in at least one embodiment, can include one or more memory controllers to provide an interface to system memory 1210. System memory 1210 may be used to load and store data and/or instructions, for example, for system 1200. System memory 1210, in at least one embodiment, can include any suitable volatile memory, such as suitable dynamic random access memory (DRAM) for example. System control logic 1208, in at least one embodiment, can include one or more I/O controllers to provide an interface to display device 1212, touch controller(s) 1202, sensor input controller(s) 1240, and non-volatile memory and/or storage device(s) 1230.

Non-volatile memory and/or storage device(s) 1230 may be used to store data and/or instructions, for example within software 1234. Non-volatile memory and/or storage device(s) 1230 may include any suitable non-volatile memory, such as flash memory for example, and/or may include any suitable non-volatile storage device(s), such as one or more hard disc drives (HDDs), solid state drives (SSDs), etc. for example.

Power management controller 1220 may include power management logic 1232 configured to control various power management and/or power saving functions. In at least one example embodiment, power management controller 1220 is configured to reduce the power consumption of components or devices of system 1200 that may either be operated at reduced power or turned off when the device (e.g., device 200) is in an inactive state (e.g., not being accessed by user, not receiving communications, etc.). For example, in at least one embodiment, when the device is in an inactive state, power management controller 1220 performs one or more of the following: power down the unused portion of the display and/or any backlight associated therewith; allow one or more of processor(s) 1206 to go to a lower power state if less computing power is required in the closed configuration; and shutdown any devices and/or components (e.g., wireless module) that may be unused when an electronic device is in an inactive state.

Communications interface(s) 1218 may provide an interface for system 1200 to communicate over one or more networks and/or with any other suitable device. Communications interface(s) 1218 may include any suitable hardware and/or firmware. Communications interface(s) 1218, in at least one embodiment, may include, for example, a network adapter, a wireless network adapter, a telephone modem, and/or a wireless modem.

One or more display controllers 1214 generate screen data for displaying images on one or more respective display screens of display devices 1212.

System control logic 1208, in at least one embodiment, can include one or more I/O controllers to provide an interface to any suitable input/output device(s) such as, for example, an audio device (not shown) to help convert sound into corresponding digital signals and/or to help convert digital signals into corresponding sound, a camera or a camcorder.

At least one processor 1206 may be packaged together with logic for one or more controllers of system control logic 1208. For example, at least one processor 1206 may be packaged together with logic for one or more controllers of system control logic 1208 to form a System in Package (SiP). In another example, at least one processor 1206 may be integrated on the same die with logic for one or more controllers of system control logic 1208. In a further example, at least one processor 1206 may be integrated on the same die with logic for one or more controllers of system control logic 1208 to form a System on Chip (SoC).

For touch control, touch controller(s) 1202 may include touch sensor interface circuitry 1224 and touch control logic 1226. A touch controller and its corresponding touch input device 1216 is described herein with reference to a particular display device 1212. Depending on the embodiment, however, a different touch controller and corresponding touch device 1216 may be configured for each display device 1212 if multiple display devices are implemented. Touch sensor interface circuitry 1224 may be coupled to one or more touch sensor(s) 1222 to detect touch input(s) over a touch surface layer a display device 1212. Touch sensor interface circuitry 1224 may include any suitable circuitry that may depend, for example, at least in part on the touch-sensitive technology used for the particular touch input device 1216, which may include one or more touch sensor(s) 1222. Touch sensor interface circuitry 1224, in one embodiment, may support any suitable multi-touch technology. Touch sensor interface circuitry 1224, in at least one embodiment, can include any suitable circuitry to convert analog signals corresponding to the touch surface layer into any suitable digital touch input data.

Touch control logic 1226 may be coupled to help control touch sensor interface circuitry 1224 in any suitable manner to detect touch input over a touch surface layer of a display device. Touch control logic 1226 for at least one embodiment may also be coupled to output, in any suitable manner, digital touch input data corresponding to touch input detected by touch sensor interface circuitry 1224. Touch control logic 1226 may be implemented using any suitable logic, including any suitable hardware, firmware, and/or software logic (e.g., non-transitory tangible media), that may depend, for example, at least in part on the circuitry used for touch sensor interface circuitry 1224. Touch control logic 1226 for at least one embodiment may support any suitable multi-touch technology.

Touch control logic 1226 may be coupled to output digital touch input data to system control logic 1208 and/or at least one processor 1206 for processing. At least one processor 1206 for at least one embodiment may execute any suitable software to process digital touch input data output from touch control logic 1226. Suitable software may include, for example, any suitable driver software and/or any suitable application software. As illustrated in FIG. 12, system memory 1210 may store software 1228, which is invoked and/or currently executing, and non-volatile memory and/or storage device 1230 may store software 1234.

For other sensor input controls, one or more sensor controllers 1240 may include sensor interface circuitry 1242 and sensor control logic (e.g., for motion sensor control, fingerprint sensor control, audio sensor control, button press control, other biometric sensors' control, etc.). Sensor interface circuitry 1242 may be coupled to a sensor input device 1250 (e.g., motion sensor, fingerprint sensor, microphone, button, facial feature sensor, hand feature sensor, pulse sensor, vein pattern sensor, eye (retina and/or iris) sensor, other biometric sensors, or any non-biometric sensor) to control the operation of the particular input device and receive the particular inputs (e.g., movement measurements, captured fingerprints, voice commands, button press signals, voice patterns, eye retinas and/or irises, facial features, hand features, palm prints, pulse features, vein patterns, etc.). Sensor interface circuitry 1242 may include any suitable circuitry that may depend, for example, at least in part on the particular technology (e.g., motion sensor technology, fingerprint sensor technology, microphone technology, button press technology, other biometric sensor technology, non-biometric sensor technology, etc.) used for the particular input device. For example, sensor interface circuitry 1242 for a fingerprint sensor may support multi-fingerprint capturing technology and may be provided in one or more display devices 1212 or another separate fingerprint capturing surface. In another example, sensor interface circuitry 1242 for a motion sensor may support both accelerometer measurements and gyroscope measurements. Depending on the particular sensor used, sensor interface circuitry 1242 may include suitable circuitry to convert analog signals to into any suitable digital data.

Sensor control logic 1244 may be coupled to control sensor interface circuitry 1242 in any suitable manner to control the particular sensor and to capture appropriate data. Sensor control logic 1244, for at least one embodiment, may also be coupled to output, in any suitable manner, digital data detected by sensor interface circuitry 1242. Sensor control logic 1244 may be implemented using any suitable logic, including any suitable hardware, firmware, and/or software logic (e.g., non-transitory tangible media), that may depend, for example, at least in part on the circuitry used for sensor interface circuitry 1242. Sensor control logic 1244, for at least one embodiment, may support any suitable motion detection technology, any suitable multi-fingerprint capturing technology, and any other biometric or non-biometric technology associated with the particular sensor being used.

Sensor control logic 1244 may be coupled to output digital data (e.g., movement data, fingerprint data, voice data, button press data, etc.) to system control logic 1208 and/or at least one processor 1206 for processing. At least one processor 1206 for at least one embodiment may execute any suitable software to process the digital data output from sensor control logic 1244. For example, digital data may, in one or more embodiments, be decrypted using a trusted symmetric key (e.g., 156) and then used to authenticate a user. Suitable software may include, for example, any suitable driver software and/or any suitable application software. As illustrated in FIG. 12, system memory 1210 may store suitable software 1228 and/or non-volatile memory and/or storage device(s) may store any suitable software 1234.

Embodiments of the mechanisms disclosed herein may be implemented in hardware, software, firmware, or a combination of such implementation approaches. Embodiments of this disclosure may be implemented, at least in part, as computer programs or program code executing on programmable systems comprising at least one processor, a storage system (including volatile and non-volatile memory and/or storage elements), at least one input device, and at least one output device.

Program code (e.g., 904, 1030, 1228), may be applied to input instructions to perform at least some of the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor, among other examples.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of this disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Note that with the numerous examples provided herein, interaction may be described in terms of two, three, four, or more network elements, hosts, devices, computing systems, modules, engines, and/or other components. However, this has been done for purposes of clarity and example only. It should be appreciated that the system can be divided (e.g., segmented, partitioned, separated, etc.) in any suitable manner. For example, components of platform provisioning host 120 and/or sensor provisioning host 130 may be provided in alternative configurations such that multiple hosts, nodes, network elements, devices, etc., coordinate to perform the activities of platform provisioning host 120 and multiple hosts, nodes, network elements, devices, etc., coordinate to perform the activities of sensor provisioning host 130. Along similar design alternatives, any of the illustrated modules, nodes, elements, hosts, devices, systems, and other components of FIGS. 1 and 2 may be consolidated or combined in various possible configurations, all of which are clearly within the broad scope of this specification. It should be appreciated that the embodiments illustrated in FIGS. 1 and 2 (and their teachings) are readily scalable and can accommodate a large number of components, as well as more complicated/sophisticated arrangements and configurations. Accordingly, the examples provided should not limit the scope or inhibit the broad teachings of the systems as potentially applied to a myriad of other architectures.

It is also important to note that the operations described with reference to the preceding FIGURES illustrate only some of the possible scenarios that may be executed by, or within, the systems (e.g., 100) and devices (e.g., 200). Some of these operations may be deleted or removed where appropriate, or these operations may be modified or changed considerably without departing from the scope of the discussed concepts. In addition, the timing of these operations may be altered considerably and still achieve the results taught in this disclosure. As one example, the processes depicted in the accompanying figures do not necessarily require the particular order shown, or sequential order, to achieve the desired results. In certain implementations, multitasking and parallel processing may be advantageous. The preceding operational flows have been offered for purposes of example and discussion. Substantial flexibility is provided by the system in that any suitable arrangements, chronologies, configurations, and timing mechanisms may be provided without departing from the teachings of the discussed concepts.

As used herein, unless expressly stated to the contrary, use of the phrase 'at least one of' refers to any combination of the named items, elements, conditions, or activities. For example, 'at least one of X, Y, and Z' is intended to mean any of the following: 1) at least one X, but not Y and not Z; 2) at least one Y, but not X and not Z; 3) at least one Z, but not X and not Y; 4) at least one X and at least one Y, but not Z; 5) at least one X and at least one Z, but not Y; 6) at least one Y and at least one Z, but not X; or 7) at least one X, at least one Y, and at least one Z.

Unless expressly stated to the contrary, the numbering adjectives 'first', 'second', 'third', etc., are intended to distinguish the particular terms (e.g., element, condition, module, activity, operation, claim element, etc.) they precede, but are not intended to indicate any type of order, rank, importance, temporal sequence, or hierarchy of the modified term. For example, 'first X' and 'second X' are intended to designate two separate X elements that are not necessarily limited by any order, rank, importance, temporal sequence, or hierarchy of the two elements.

References in the specification to "one embodiment," "an embodiment," "some embodiments," etc., indicate that the embodiment(s) described may include a particular feature, structure, or characteristic, but every embodiment may or may not necessarily include that particular feature, structure, or characteristic. Moreover, such phrases are not necessarily referring to the same embodiment.

While this specification contains many specific implementation details, these should not be construed as limitations on the scope of any embodiments or of what may be claimed, but rather as descriptions of features specific to particular embodiments of the subject matter disclosed herein. Certain features that are described in this specification in the context of separate embodiments can also be implemented in combination in a single embodiment. Conversely, various features that are described in the context of a single embodiment may also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

OTHER NOTES AND EXAMPLES

The following examples pertain to embodiments in accordance with this specification. Example A1 provides an apparatus, a system, one or more machine readable storage mediums, a method, and/or hardware-, firmware-, and/or software-based logic, where the Example of A1 is to identify a first encrypted key of a first set of encrypted keys based on an index; identify a second encrypted key of a second set of encrypted keys based on the index; extract, at a sensor, a first trusted symmetric key from the first encrypted key using a first decryption algorithm and a first decryption key; receive the second encrypted key at a computing platform from the sensor; and extract, at the computing platform, a second trusted symmetric key from the second encrypted key using a second decryption algorithm and a second decryption key, where the first trusted symmetric key matches the second trusted symmetric key.

In Example A2, the subject matter of Example A1 can optionally include to randomly select the index, and send the index to the sensor prior to receiving the second encrypted key.

In Example A3, the subject matter of any one of Examples A1-A2 can optionally include to store the second trusted symmetric key in a protected area of a memory element of the computing platform.

In Example A4, the subject matter of any one of Examples A1-A3 can optionally include to detect an event, and generate a new trusted symmetric key to replace the second trusted symmetric key based on detecting the event.

In Example A5, the subject matter of A4 can optionally include that the event includes one of an expiration of an interval of time, receipt of encrypted input data from the sensor, or an indication that the second trusted symmetric key is compromised.

In Example A6, the subject matter of any one of Examples A1-A5 can optionally include to generate a new trusted symmetric key to replace the first trusted symmetric key based on receiving, at the sensor, a new index from the computing platform.

In Example A7, the subject matter of A6 can optionally include that the new index is different than each index that was previously selected.

In Example A8, the subject matter of any one of Examples A1-A7 can optionally include that the second decryption algorithm is asymmetrical.

In Example A9, the subject matter of any one of Examples A1-A8 can optionally include to identify, based on the index, an encrypted private key of an encrypted key pair in a set of encrypted key pairs; and extract the second encryption key from the encrypted private key by decrypting the encrypted private key using a third decryption algorithm and a third decryption key.

In Example A10, the subject matter of any one of Examples A1-A9 can optionally include to identify, based on the index, the second encrypted key in the second set of encrypted keys, where the second set of encrypted keys are embedded in the sensor; and send the second encrypted key to the computing platform.

In Example A11, the subject matter of any one of Examples A1-A10 can optionally include that the first decryption algorithm is symmetrical and the first decryption key is a unique key identifying the sensor.

In Example A12, the subject matter of any one of Examples A1-A11 can optionally include that, when executed, some of the instructions are stored in a protected area of a memory element of the computing platform.

In Example A13, the subject matter of any one of Examples A1-A12 can optionally include to receive input data; encrypt the input data using a symmetric encryption algorithm and the first trusted symmetric key; and send the encrypted input data to the computing platform, where a second processor is configured to execute the second instructions to extract the input data from the encrypted input data using a symmetric decryption algorithm and the second trusted symmetric key.

The following examples pertain to embodiments in accordance with this specification. Example B1 provides an apparatus, a system, one or more machine readable storage mediums, a method, and/or hardware-, firmware-, and/or software-based logic, where the Example of B1 is to generate equal numbers of key pairs and symmetric keys, where each key pair includes a public key and a corresponding private key; generate a first set of encrypted keys by encrypting the symmetric keys using a first encryption algorithm and, respectively, private keys of the key pairs; generate a second set of encrypted keys by encrypting the symmetric keys using a second encryption algorithm and a second key; cause the first and second sets of encrypted keys to be sent to a host associated with a sensor; generate a third set of encrypted keys by encrypting the private keys of the key pairs using a third encryption algorithm and a third key; and cause the third set of encrypted keys to be stored in a computing platform.

In Example B2, the subject matter of B1 can optionally include to receive the second key from the host associated with the sensor.

In Example B3, the subject matter of any one of Examples B1-B2 can optionally include that the second key is a public key of a key pair associated with the sensor.

In Example B4, the subject matter of any one of Examples B1-B3 can optionally include that the third key is a unique key identifying the computing platform.

In Example B5, the subject matter of any one of Examples B1-B4 can optionally include to delete the public keys of the number of key pairs.

In Example B6, the subject matter of any one of Examples B1-B5 can optionally include that the first and second encryption algorithms are asymmetrical, and that the third encryption algorithm is symmetrical.

In Example B7, the subject matter of any one of Examples B1-B6 can optionally include that the third set of encrypted keys are stored in a protected area of a memory element of the computing platform in a trusted execution environment (TEE).

An Example X1 provides an apparatus, the apparatus comprising means for performing the method of any one of the preceding examples.

In Example X2, the subject matter of Example X1 can optionally include that the means for performing the method comprises at least one processor and at least one memory element.

In Example X3, the subject matter of Example X2 can optionally include that the at least one memory element comprises machine readable instructions that when executed, cause the apparatus to perform the method of any one of the Examples A1-A13 or B1-B7.

In Example X4, the subject matter of any one of Examples X1-X3 can optionally include that the apparatus is one of a computing system or a system-on-a-chip.

Example Y1 provides at least one machine readable storage medium comprising instructions, where the instructions when executed realize an apparatus or implement a method in any one of the preceding examples.

What is claimed is:

1. An apparatus, comprising:
    a computing platform; and
    a sensor coupled to the computing platform and including a first processor configured to execute first instructions to:
        identify, based on an index, a first encrypted key of a first set of encrypted keys;
        identify, based on the index, a second encrypted key of a second set of encrypted keys stored in the sensor;
        extract a first trusted symmetric key from the first encrypted key using a first decryption algorithm and a first decryption key; and
        send the second encrypted key to the computing platform,
    wherein the computing platform includes a memory element and a second processor configured to execute second instructions stored in the memory element to:
        receive the second encrypted key from the sensor;
        extract a second trusted symmetric key from the second encrypted key using a second decryption algorithm and a second decryption key, wherein the first trusted symmetric key matches the second trusted symmetric key;
        receive encrypted input data from the sensor; and
        extract input data from the encrypted input data using a symmetric decryption algorithm and the second trusted symmetric key.

2. The apparatus of claim 1, wherein the second processor is configured to execute the second instructions to:
    randomly select the index; and
    send the index to the sensor prior to receiving the second encrypted key.

3. The apparatus of claim 1, wherein the second processor is configured to execute the second instructions to:
    store the second trusted symmetric key in a protected memory area of the memory element.

4. The apparatus of claim 1, wherein the second processor is configured to execute the second instructions to:
    detect an event; and
    generate a new trusted symmetric key based on detecting the event.

5. The apparatus of claim 4, wherein the event includes one of an expiration of an interval of time, receipt of the encrypted input data from the sensor, or an indication that the second trusted symmetric key is compromised.

6. The apparatus of claim 1, wherein the first processor is configured to execute the first instructions to:
    generate a new trusted symmetric key based on receiving a new index from the computing platform.

7. The apparatus of claim 1, wherein the second decryption algorithm is asymmetrical.

8. The apparatus of claim 7, wherein the second processor is configured to execute the second instructions to:
    identify, based on the index, an encrypted private key generated from a private key of a key pair in a set of key pairs; and
    extract the second decryption encryption key from the encrypted private key by decrypting the encrypted private key using a third decryption algorithm and a third decryption key.

9. The apparatus of claim 1, wherein the first decryption algorithm is symmetrical and the first decryption key is a unique key identifying the sensor.

10. The apparatus of claim 1, wherein, when executed, the second instructions are stored in a protected area of the memory element.

11. The apparatus of claim 1, wherein the first processor is configured to execute the first instructions to:
    detect the input data;
    encrypt the input data using a symmetric encryption algorithm and the first trusted symmetric key to generate the encrypted input data; and
    send the encrypted input data to the computing platform.

12. At least one non-transitory machine readable medium having instructions stored thereon, the instructions when executed by at least one processor cause the at least one processor to:
    identify a first encrypted key of a first set of encrypted keys based on an index;

identify a second encrypted key of a second set of encrypted keys based on the index, wherein the second set of encrypted keys are stored in a sensor;

send the second encrypted key from the sensor to a computing platform;

extract, at the sensor, a first trusted symmetric key from the first encrypted key using a first decryption algorithm and a first decryption key;

receive the second encrypted key at the computing platform from the sensor;

extract, at the computing platform, a second trusted symmetric key from the second encrypted key using a second decryption algorithm and a second decryption key, wherein the first trusted symmetric key matches the second trusted symmetric key;

receive encrypted input data at the computing platform from the sensor; and extract input data from the encrypted input data using a symmetricdecryption algorithm and the second trusted symmetric key.

13. The at least one non-transitory machine readable medium of claim 12, wherein the instructions, when executed by the at least one processor, cause the at least one processor to:

randomly select the index; and send the index to the sensor prior to receiving the second encrypted key.

14. The at least one non-transitory machine readable medium of claim 12, wherein the instructions, when executed by the at least one processor, cause the at least one processor to:

detect an event; and generate a new trusted symmetric key to replace the second trusted symmetric key based on detecting the event.

15. The at least one non-transitory machine readable medium of claim 12, wherein the instructions, when executed by the at least one processor, cause the at least one processor to:

generate a new trusted symmetric key to replace the first trusted symmetric key based on receiving, at the sensor, a new index from the computing platform.

16. The at least one non-transitory machine readable medium of claim 12, wherein the instructions, when executed by the at least one processor, cause the at least one processor to:

identify, based on the index, an encrypted private key generated from a private key of a key pair in a set of key pairs; and extract the second decryption key from the encrypted private key by decrypting the encrypted private key using a third decryption algorithm and a third decryption key.

17. The at least one non-transitory machine readable medium of claim 12, wherein the instructions, when executed by the at least one processor, cause the at least one processor to:

detect the input data at the sensor;

encrypt the input data at the sensor using a symmetric encryption algorithm and the first trusted symmetric key to generate the encrypted input data; and send the encrypted input data to the computing platform.

18. A method, the method comprising:

identifying a first encrypted key of a first set of encrypted keys based on an index;

identifying a second encrypted key of a second set of encrypted keys based on the index, wherein the second set of encrypted keys are stored in a sensor;

sending the second encrypted key from the sensor to a computing platform;

extracting, at the sensor, a first trusted symmetric key from the first encrypted key using a first decryption algorithm and a first decryption key;

receiving the second encrypted key at the computing platform from the sensor;

extracting, at the computing platform, a second trusted symmetric key from the second encrypted key using a second decryption algorithm and a second decryption key, wherein the first trusted symmetric key matches the second trusted symmetric key;

receiving encrypted input data from the sensor; and extracting input data from the encrypted input data using a symmetric decryption algorithm and the second trusted symmetric key.

19. The method of claim 18, further comprising:

detecting an event;

selecting, by the computing platform, a new index based on detecting the event;

generating a first new trusted symmetric key to replace the first trusted symmetric key based on receiving the new index at the sensor from the computing platform; and generating a second new trusted symmetric key to replace the second trusted symmetric key.

20. The method of claim 19, wherein the new index is different than each index that was previously selected.

21. At least one non-transitory machine readable medium having instructions stored thereon, the instructions when executed by at least one processor cause the at least one processor to:

generate equal numbers of key pairs and symmetric keys, wherein each key pair includes a public key and a corresponding private key;

generate a first set of encrypted keys by encrypting the symmetric keys using a first encryption algorithm and, respectively, public keys of the key pairs;

generate a second set of encrypted keys by encrypting the symmetric keys using a second encryption algorithm and a second key;

cause the first and second sets of encrypted keys to be sent to a host associated with a sensor;

generate a third set of encrypted keys by encrypting the private keys of the key pairs using a third encryption algorithm and a third key; and cause the third set of encrypted keys to be stored in a computing platform.

22. The at least one non-transitory machine readable medium of claim 21, wherein the instructions, when executed by the at least one processor, cause the at least one processor to:

receive the second key from the host associated with the sensor.

23. The at least one non-transitory machine readable medium of claim 21, wherein the first and second encryption algorithms are asymmetrical, and wherein the third encryption algorithm is symmetrical.

* * * * *